US010539182B2

(12) United States Patent
Blair et al.

(10) Patent No.: US 10,539,182 B2
(45) Date of Patent: Jan. 21, 2020

(54) EFFICIENCY JOURNAL BEARING

(71) Applicant: Waukesha Bearings Corporation, Pewaukee, WI (US)

(72) Inventors: Barry Blair, Oconomowoc, WI (US); Richard Livermore-Hardy, Hunton Bridge (GB); Dan Brandenburg, Colgate, WI (US)

(73) Assignee: Waukesha Bearings Corporation, Waukesha, WI (US)

( * ) Notice: Subject to any disclaimer, the term of this patent is extended or adjusted under 35 U.S.C. 154(b) by 0 days.

(21) Appl. No.: 15/947,621

(22) Filed: Apr. 6, 2018

(65) Prior Publication Data
US 2018/0291958 A1  Oct. 11, 2018

Related U.S. Application Data

(60) Provisional application No. 62/482,279, filed on Apr. 6, 2017.

(51) Int. Cl.
*F16C 32/06* (2006.01)
*F16C 17/03* (2006.01)
*F16C 33/10* (2006.01)
*F16C 17/06* (2006.01)

(52) U.S. Cl.
CPC .......... *F16C 32/0696* (2013.01); *F16C 17/03* (2013.01); *F16C 33/1085* (2013.01); *F16C 17/06* (2013.01); *F16C 32/067* (2013.01); *F16C 33/1065* (2013.01)

(58) Field of Classification Search
CPC .............................. F16C 32/0666; F16C 17/03
See application file for complete search history.

(56) References Cited

U.S. PATENT DOCUMENTS 3,687,510 A * 8/1972 Cooper .................. F16C 17/03
                                                    384/311
4,291,926 A   9/1981 Tomioka et al.
4,597,676 A   7/1986 Vohr et al.
(Continued)

FOREIGN PATENT DOCUMENTS

EP    08320016 A    3/1996
JP    1987104016 U1  7/1987
(Continued)

OTHER PUBLICATIONS

European Patent Office, Supplementary European Search Report, Waukesha Bearings Corporation Applicatio No./Patent No. 14773796.9, dated Sep. 26, 2016.
(Continued)

*Primary Examiner* — Thomas R Hannon
(74) *Attorney, Agent, or Firm* — Hamilton IP Law, PC; Jay R. Hamilton; Charles A. Damschen

(57) ABSTRACT

A hybrid bearing may increase heat transfer, bearing load capacity, and bearing life in various applications, including but not limited to radial and axial tilting pad bearings. In the illustrative hybrid bearings, the hybrid bearing may comprise at least one tilt pad that is moveable with respect to a main body and at least one fixed pad that is fixed with respect to the main body. Either the fixed pad or the tilt pad (and/or a surface thereof) may be comprised of a non-metallic material (e.g., a polymer or a ceramic material).

20 Claims, 19 Drawing Sheets

(56) References Cited

U.S. PATENT DOCUMENTS

| | | | |
|---|---|---|---|
| 4,686,403 A * | 8/1987 | Hackstie | H02K 5/1672 |
| | | | 310/90 |
| 5,222,815 A | 6/1993 | Ide | |
| 5,288,153 A | 2/1994 | Gardner | |
| 5,738,447 A | 4/1998 | Nicholas | |
| 5,743,657 A | 4/1998 | O'Reilly et al. | |
| 5,795,077 A * | 8/1998 | Gozdawa | F16C 33/043 |
| | | | 384/117 |
| 6,485,182 B2 | 11/2002 | Nicholas | |
| 8,123,409 B2 | 2/2012 | Waki et al. | |
| 8,366,323 B2 | 2/2013 | Waki et al. | |
| 9,874,247 B2 * | 1/2018 | Wang | F16C 32/0655 |
| 2008/0013872 A1 | 1/2008 | Geiger | |
| 2010/0142870 A1 | 6/2010 | Waki et al. | |
| 2014/0270607 A1 | 9/2014 | Livermore-Hardy et al. | |
| 2016/0047308 A1 | 2/2016 | Williamson et al. | |

FOREIGN PATENT DOCUMENTS

| | | |
|---|---|---|
| JP | 0932848 | 2/1997 |
| JP | 1997032848 | 2/1997 |
| JP | 2006112499 A | 4/2006 |
| JP | 2010116956 A | 5/2010 |
| RU | 137764 U1 | 2/2014 |
| WO | 2014160493 A1 | 10/2014 |

OTHER PUBLICATIONS

International Search Report and Written Opinion for PCT/US2014/026833, dated Jul. 15, 2014.

Japan Patent Office, Office Action, Application 2016-502259, dated Jan. 10, 2018.

* cited by examiner

EFFICIENCY JOURNAL BEARING

CROSS REFERENCE TO RELATED APPLICATIONS

The present non-provisional utility patent application claims the filing benefit of provisional U.S. Pat. App. No. 62/482,279 filed on Apr. 6, 2017.

FIELD

The present invention relates to bearings.

STATEMENT REGARDING FEDERALLY SPONSORED RESEARCH OR DEVELOPMENT

No federal funds were used to develop or create the invention disclosed and described in the patent application.

REFERENCE TO SEQUENCE LISTING, A TABLE, OR A COMPUTER PROGRAM LISTING COMPACT DISK APPENDIX

Not Applicable

BACKGROUND

Many types of bearings exist. Tilting pad journal bearings typically rely on a fluid film for adequate operation. However, the temperature of the fluid film and the temperature of the surface of the bearing in such bearings can greatly affect the performance and life of the bearing. Accordingly, individuals have attempted to cool surface of the bearing that may be in direct contact with the fluid. For example, U.S. Pat. No. 6,485,182, which is incorporated by reference herein in its entirety, discloses a sleeve bearing with bypass cooling. Additionally, U.S. Pat. Nos. 8,123,409; 5,743,657; and 4,597,676 as well as U.S. patent application Ser. Nos. 14/460,418; 14/210,339 disclose various bearings that may be relevant background to one or more aspects of the present disclosure. Alternate materials from traditional bearing surface materials are used in journal bearings in order allow operation at higher temperatures and higher unit loads. Consequently, operation at higher temperatures and higher unit loads allow for smaller bearings with lower power loss. In conjunction with other features, for example U.S. Pat. No. 4,597,676, to reduce power loss, alternate materials allow for additional power loss savings.

BRIEF DESCRIPTION OF THE FIGURES

The accompanying drawings, which are incorporated in and constitute a part of this specification, illustrate embodiments and together with the description, serve to explain the principles of the methods and systems.

DETAILED DESCRIPTION—LISTING OF ELEMENTS

Figure 1:
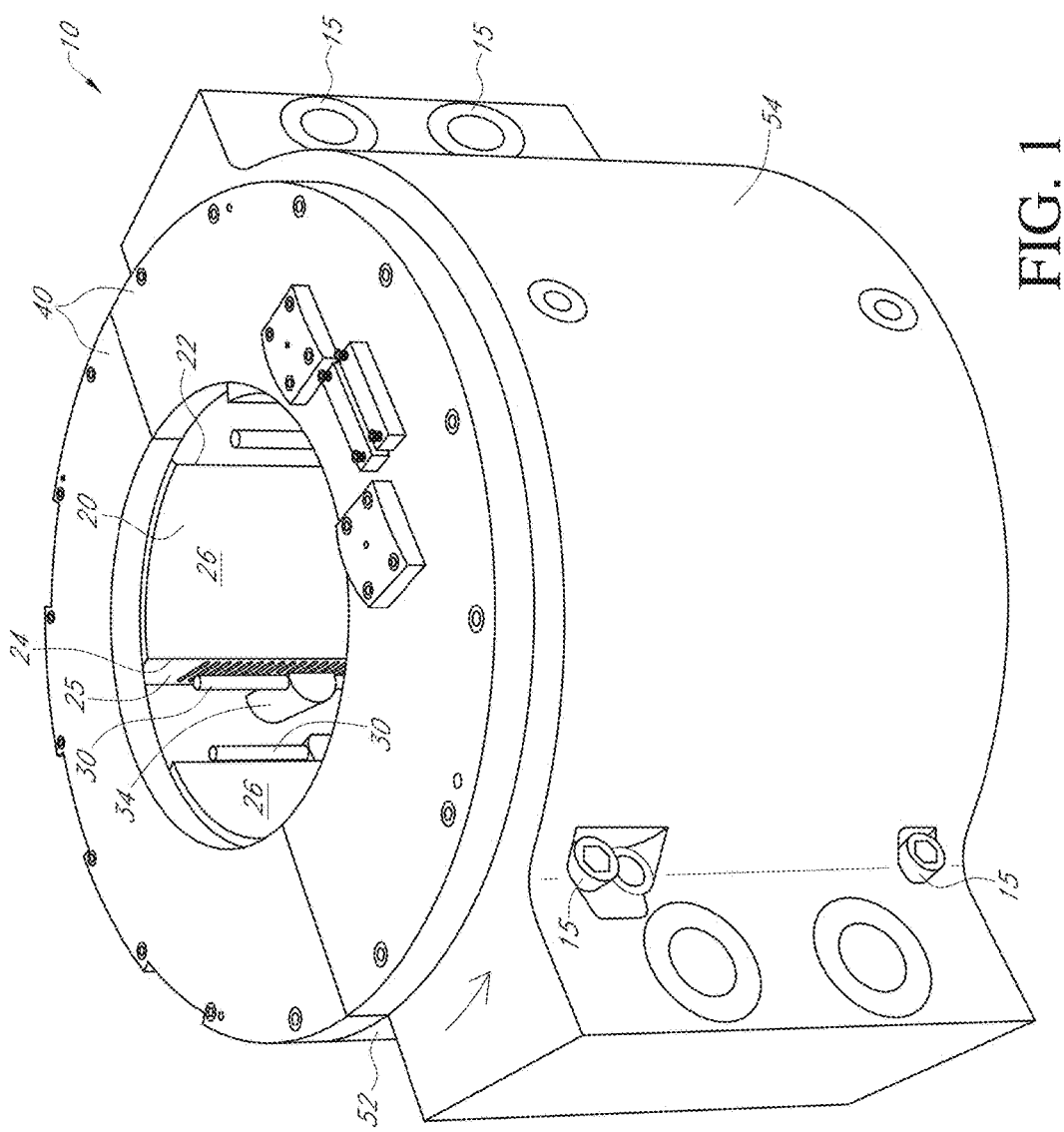
FIG. 1 provides a perspective view of an illustrative embodiment of a trailing edge cooled bearing.

| ELEMENT DESCRIPTION | ELEMENT # |
| --- | --- |
| Trailing edge cooled bearing | 10 |
| Machine housing | 11 |
| Cap | 11a |
| Fastener | 15 |
| Pad | 20 |
| Leading edge | 22 |
| Trailing edge | 24 |
| Trailing edge face | 25 |
| Groove | 25a |
| Active surface | 26 |
| Ball | 28 |
| Spray bar | 30 |
| Aperture | 32 |
| Shank | 34 |
| End plate | 40 |
| Annulus | 42 |
| Main body | 50 |
| Channel | 51 |
| Top portion | 52 |
| Bottom portion | 54 |

| ELEMENT DESCRIPTION | ELEMENT # |
| --- | --- |
| Socket | 56 |
| Hybrid bearing | 10' |
| Non-metallic material | 12' |
| Metallic material | 14' |
| Fixed pad | 20a' |
| Fixed pad leading edge | 22a' |
| Fixed pad trailing edge | 24a' |
| Fixed pad active surface | 26a' |
| Tilt pad | 20b' |
| Tilt pad leading edge | 22b' |
| Tilt pad trailing edge | 24b' |
| Trailing edge face | 25' |
| Groove | 25a' |
| Tilt pad active surface | 26b' |
| Surface feature | 27' |
| Ball | 28' |
| Spray bar | 30' |
| Aperture | 32' |
| Shank | 34' |
| End plate | 40' |
| Main body | 50' |
| Channel | 51' |
| Top portion | 52' |
| Bottom portion | 54' |
| Socket | 56' |
| Annular groove | 58' |

DETAILED DESCRIPTION

Before the present methods and apparatuses are disclosed and described, it is to be understood that the methods and apparatuses are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes¬ from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and apparatuses. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and apparatuses. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and apparatuses may be understood more readily by reference to the following detailed description of preferred aspects and the examples included therein and to the Figures and their previous and following description. The terms bearing and hybrid bearing 10' may be used interchangeably when referring to generalities of configuration and/or corresponding components, aspects, features, functionality, methods and/or materials of construction, etc. thereof, unless explicitly stated otherwise.

Before the various aspects of the present disclosure are explained in detail, it is to be understood that the disclosure is not limited in its application to the details of construction and the arrangements of components set forth in the following description or illustrated in the drawings. The present disclosure is capable of other embodiments and of being practiced or of being carried out in various ways. Also, it is to be understood that phraseology and terminology used herein with reference to device or element orientation (such as, for example, terms like "front", "back", "up", "down", "top", "bottom", and the like) are only used to simplify description, and do not alone indicate or imply that the device or element referred to must have a particular orientation. In addition, terms such as "first", "second", and "third" are used herein and in the appended claims for purposes of description and are not intended to indicate or imply relative importance or significance.

Referring now to the drawings, wherein like reference numerals designate identical or corresponding parts throughout the several views, FIG. 1 provides a perspective view of an illustrative embodiment of a trailing edge cooled bearing 10. As shown, the trailing edge cooled bearing 10 may include one or more pads 20 placed about a bore formed in the trailing edge cooled bearing 10. In the illustrative embodiment pictured in FIG. 1, the pads 20 may be configured as journal pads 20, though the scope of the present disclosure is not so limited. Accordingly, the term "journal pad" as used herein when referring to pads 20 configured according to the present disclosure in no way limits the scope of the present disclosure to trailing edge cooled bearings 10 having journal pads. Although the illustrative embodiment shown in FIG. 1 is directed primarily to a tilting pad journal bearing, the trailing edge cooled bearing 10 as disclosed and claimed herein is not so limited, and extends to any bearing in which cooling may be required, including but not limited to tilting pad thrust or journal bearings, whether unidirectional or bi-directional.

When referring to the illustrative embodiment of a trailing edge cooled bearing 10 shown in FIG. 1, each journal pad 20 may include a leading edge 22 and a trailing edge 24, the differentiation of which may depend at least upon the direction of rotation of the rotational body (e.g., a shaft) that interfaces with the trailing edge cooled bearing 10. In FIG. 1, for illustrative purposes the reference for rotational direction is counterclockwise, such that the left side of the two visible journal pads 20 comprises their trailing edges 24 and the right sides comprise their leading edges 22. Oftentimes the thinnest fluid film and the highest temperatures in bearings such as those pictured in FIG. 1 are experienced at the trailing edge 24 of the journal pad 20.

Figure 2:
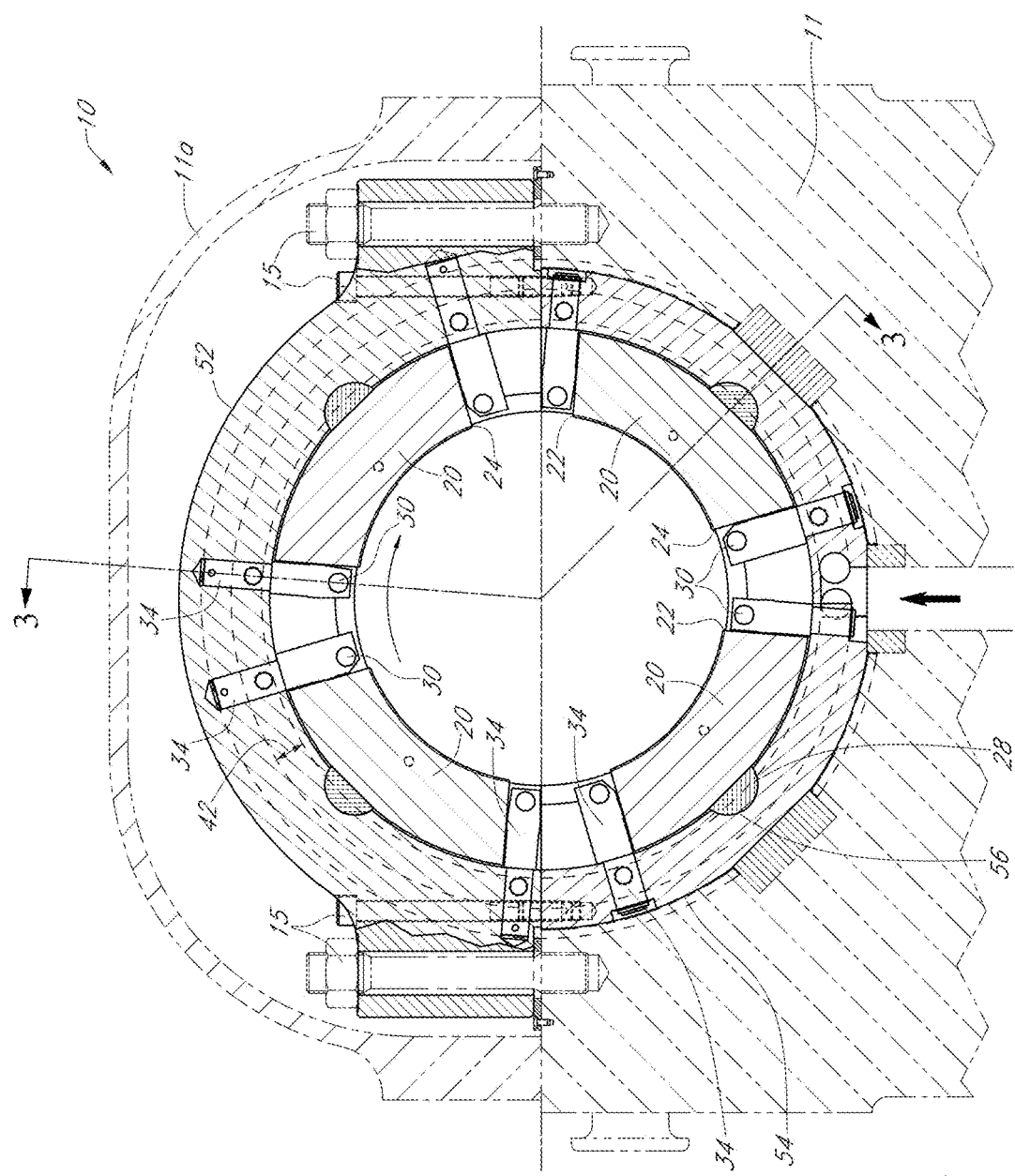
FIG. 2 provides a cross-sectional view of the embodiment of a trailing edge cooled bearing shown in FIG. 1 along an axial dimension of the trailing edge cooled bearing.
Figure 3:
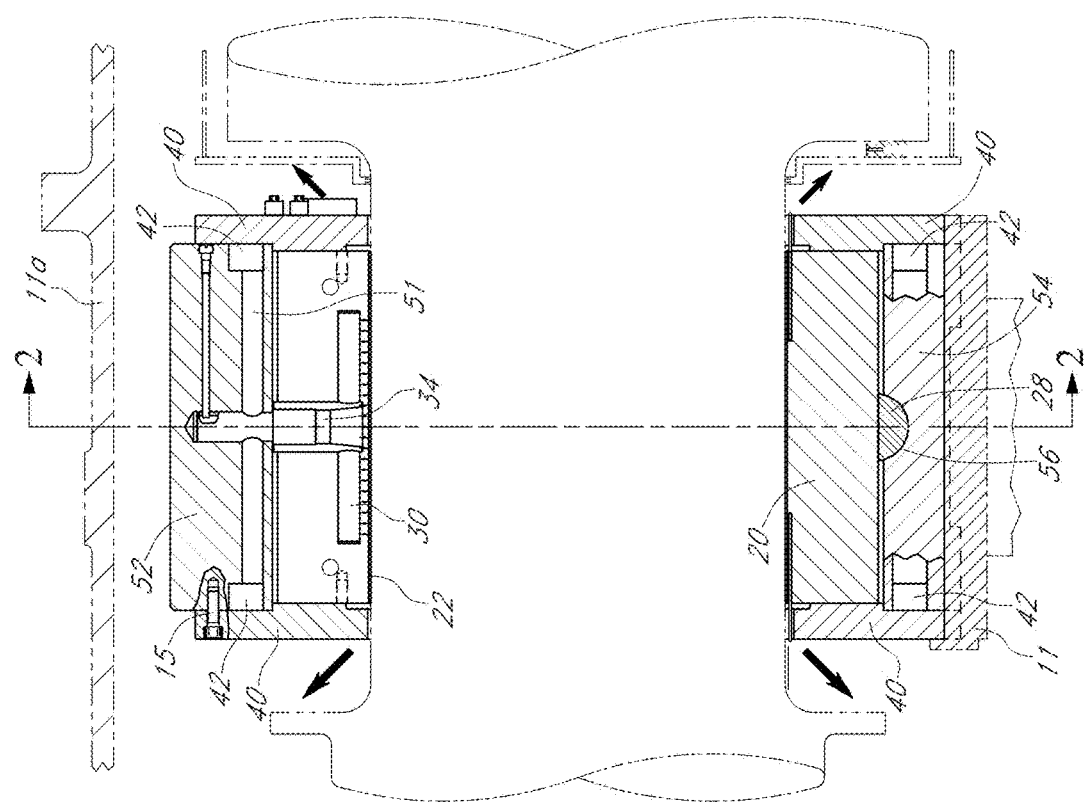
FIG. 3 provides a cross-sectional view of the embodiment of a trailing edge cooled bearing shown in FIG. 1 along a radial dimension of the trailing edge cooled bearing.

A cross-sectional view of the illustrative embodiment of a trailing edge cooled bearing 10 along a radial dimension of the trailing edge cooled bearing 10 is shown in FIG. 2, and FIG. 3 provides a cross-sectional view along an axial dimension thereof. That is, in FIG. 2 the cross-sectional plane is oriented in a radial dimension and in FIG. 3 the cross-sectional plane is oriented in an axial dimension. Referring specifically to FIG. 3, it will be appreciated that this embodiment of a trailing edge cooled bearing 10 is shown engaged with a machine housing 11 with a cap 11a positioned over the trailing edge cooled bearing 10. For reference purposes, the curved arrow in FIG. 2 indicates the direction of shaft rotation as being clockwise (as viewed from the left to the right side of the sectional view), which direction of rotation affects the definition of the leading and trailing edges 22, 24, which is discussed in further detail below. This illustrative embodiment may be configured as a two-piece design, wherein the trailing edge cooled bearing includes a main body 50 comprised of a top portion 52 and a bottom portion 54, which may be engaged with one another via one or more fasteners 15 and corresponding apertures (which may or may not be tapped) in the top and/or bottom portions. In many applications, the bottom portion 54 may be engaged with a machine housing 11. Any suitable structure and/or method may be used to engage the trailing edge cooled bearing 10 with a machine and/or machine housing 11, including but not limited to mechanical fasteners (e.g., screws, bolts, etc.), interference fits, chemical adhesives, welding, and/or combinations thereof without limitation. Additionally, any suitable structure and/or method may be used to engage the top portion 52 with the bottom portion 54 of a main body 50, including but not limited to mechanical fasteners (e.g., screws, bolts, etc.), interference fits, chemical adhesives, welding, and/or combinations thereof without limitation.

In other embodiments, the trailing edge cooled bearing 10 may be configured as a single, integral structure, and in still other embodiments the trailing edge cooled bearing may be configured with more than two pieces. According, the scope of the present disclosure is not limited by the number of pieces used to construct the trailing edge cooled bearing 10 and extends embodiments thereof using a single, integral main body 50 and those embodiments using two or more pieces engaged with one another to form a main body 50 without limitation.

Referring now to FIG. 2, an end plate 40 may be positioned adjacent either axial face of the main body 50. Either end plate 40 may be engaged with the main body 50 via one or more fasteners 15 as shown in FIG. 2. However, any suitable structure and/or method may be used to engage an end plate 40 with the main body 50, including but not limited to mechanical fasteners (e.g., screws, bolts, etc.), interference fits, chemical adhesives, welding, and/or combinations thereof without limitation. Each end plate 40 may be configured such that the inner diameter thereof is positioned in relatively close proximity to the diameter of a shaft around which the trailing edge cooled bearing 10 may be positioned. It is contemplated that the clearance between the inner diameter of the end plate 40 and the diameter of the shaft may be selected such that lubricant may exit the trailing edge cooled bearing 10 at that point. For certain embodiments this clearance may be configured to 10 millimeters (mm) but in other embodiments this clearance will be greater than 10 mm, and in still other embodiments it will be less than 10 mm. Accordingly, the scope of the present disclosure is in no way limited by this clearance, and extends to all alternative configurations for allowing lubricant to exit the trailing edge cooled bearing 10 without limitation. As used herein, the terms "lubricant" and "fluid" may be used interchangeably and generally to any fluid that may be of beneficial use in any embodiment of a trailing edge cooled bearing 10.

The main body 50 and end plates 40 may be configured to form an annulus 42 on either side of the main body 50. The main body 50 may include one or more channels 51 formed therein, which for the illustrative embodiment of the trailing edge cooled bearing 10 shown in FIG. 2 may be oriented axially with respect to the rotational axis of a shaft around which the trailing edge cooled bearing 10 may be positioned. One or more of the channels 51 formed in the main body 50 may be in fluid communication with either annulus 42 formed adjacent either axial face of the main body 50.

One or more shanks 34 may be engaged with the main body 50 at various rotational positions along in the inside diameter thereof. In the illustrative embodiment of a trailing edge cooled bearing 10, two shanks 34 may be associated with each journal pad 20, such that a total of four journal pads 20 and eight shanks 34 may be included. However, in other embodiments of the trailing edge cooled bearing 10 not pictured herein, a different number of shanks 34 may be associated with each journal pad 34. Accordingly, the scope of the present disclosure is not limited in any way by the number of shanks 34 relative to the number of any other element of the trailing edge cooled bearing 10. Furthermore, the number, relative placement, and/or configuration of journal pads 20 may vary from one embodiment of the trailing edge cooled bearing 10 to the next, and some embodiments thereof may include six journal pads 20, eight journal pads 20, or an odd number of journal pads, without limitation. Accordingly, the scope of the present disclosure is not limited in any way by the number, orientation, and/or configuration of journal pads 20.

In the illustrative embodiment, one or more fasteners 15 (which may be axially oriented) may be used to engage and/or secure each shank 34 with the main body 50, as best shown in FIG. 3. However, any suitable structure and/or method may be used to engage and/or secure each shank 34 with the main body 50, including but not limited to mechanical fasteners (e.g., screws, bolts, etc.), interference fits, chemical adhesives, welding, and/or combinations thereof without limitation.

The proximal end of each shank 34 may be positioned within the main body 50 such that an interior pathway in the shank 34 may be in fluid communication with one or more of the channels 51 formed in the main body 50. A distal end of each shank may be engaged with a spray bar 30 such that an interior pathway in the spray bar 30 may be in fluid communication with the interior pathway in the shank 34. As such, lubricant (which may be pressurized using any lubricant supply method and/or apparatus suitable for the particular application of the trailing edge cooled bearing 10) may be supplied to an annulus 42 and/or channel 51 in the main body 50, which lubricant may pass through the interior of a shank 34 and to a spray bar 30 engaged with that shank 34. Other methods and/or apparatuses may be used to supply lubricant and/or fluid to the spray bar 30 without limitation, and that shown and described herein is for illustrative purposes only, and is not meant to limit the scope of the present disclosure.

A plurality of journal pads 20 may be spaced about the inner diameter of the main body 50 at various positions. Again, the illustrative embodiment of the trailing edge cooled bearing 10 may include four journal pads 20 equally spaced about the main body 50, but the scope of the present disclosure is not so limited, and the number, relative placement, orientation, and/or configuration of journal pads 20 may vary from one embodiment of the trailing edge cooled bearing 10 to the next without limitation.

In the illustrative embodiment, each journal pad 20 may be engaged with the main body 50 via a ball-and-socket configuration. In such an embodiment, the journal pad 20 may be formed with a ball 28 on the circumferentially exterior surface thereof, wherein that ball 28 corresponds to a socket 56 formed in the main body 50. This configuration allows the journal pads 20 to move and/or tilt with respect to the main body 50. However, other embodiments of the trailing edge cooled bearing 10 use other features to allow for journal pad 20 movement and/or tilting with respect to the main body (e.g., axial ridges formed in the main body 50 that engage the journal pad 20). Accordingly, the scope of the present disclosure is in no way limited by the method and/or structure used to allow relative movement and/or tilting between the main body 50 and any journal pad 20 unless otherwise indicated in the following claims.

Figure 4:
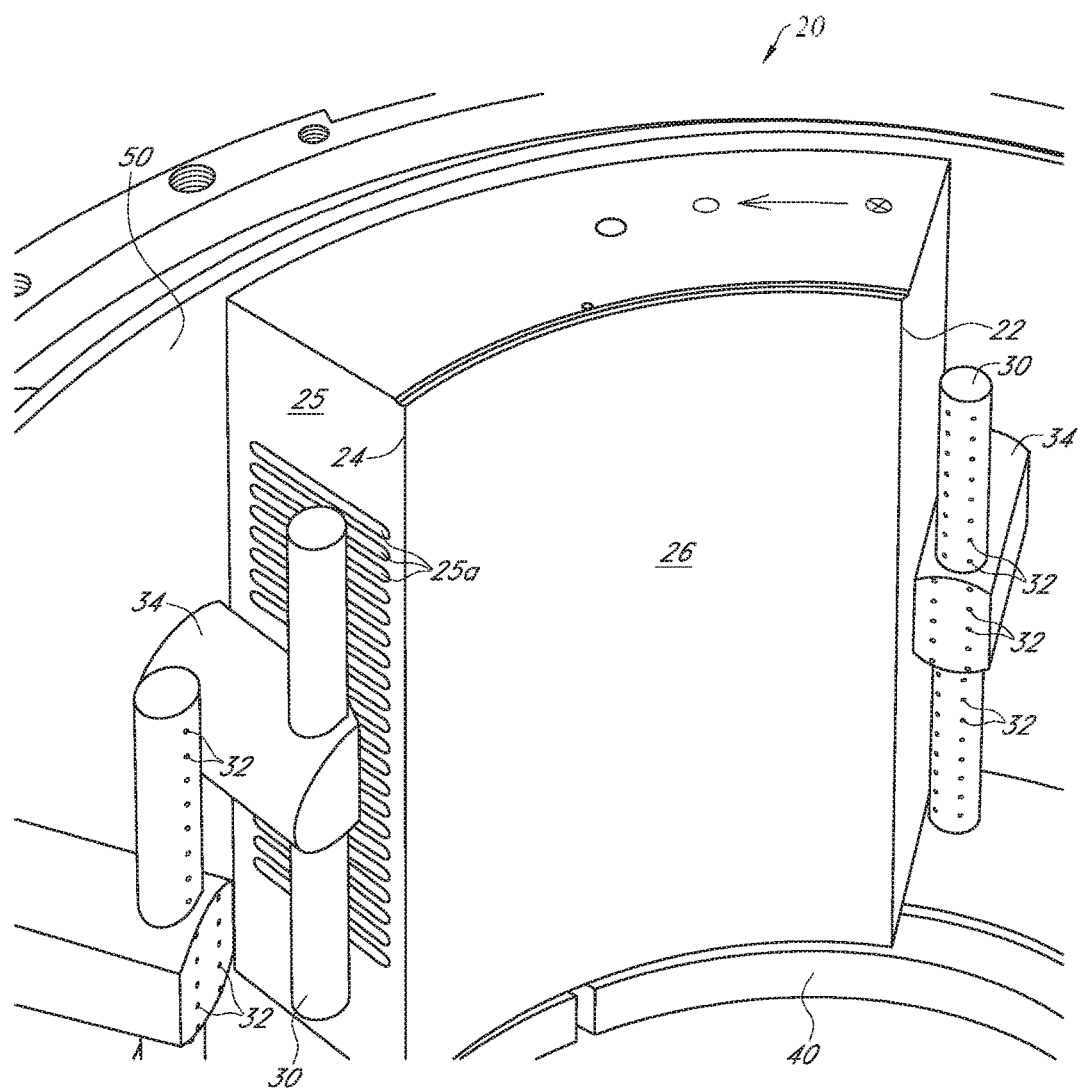
FIG. 4 provides a detailed, perspective view of a portion of the embodiment shown in FIG. 1 adjacent a journal pad.
Figure 5:
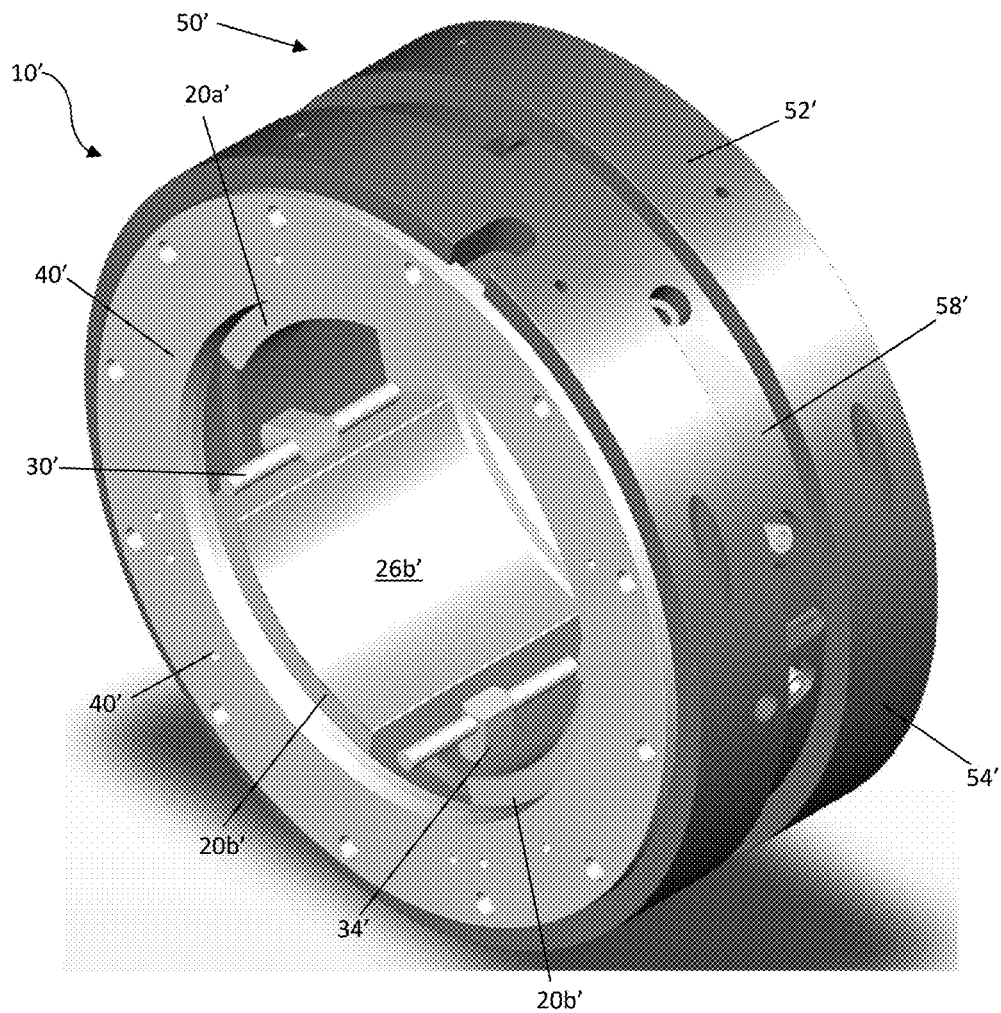
FIG. 5 provides a perspective view of illustrative aspects of a hybrid bearing employing traditional metallic bearing materials (without non-metallic material).
Figure 6:
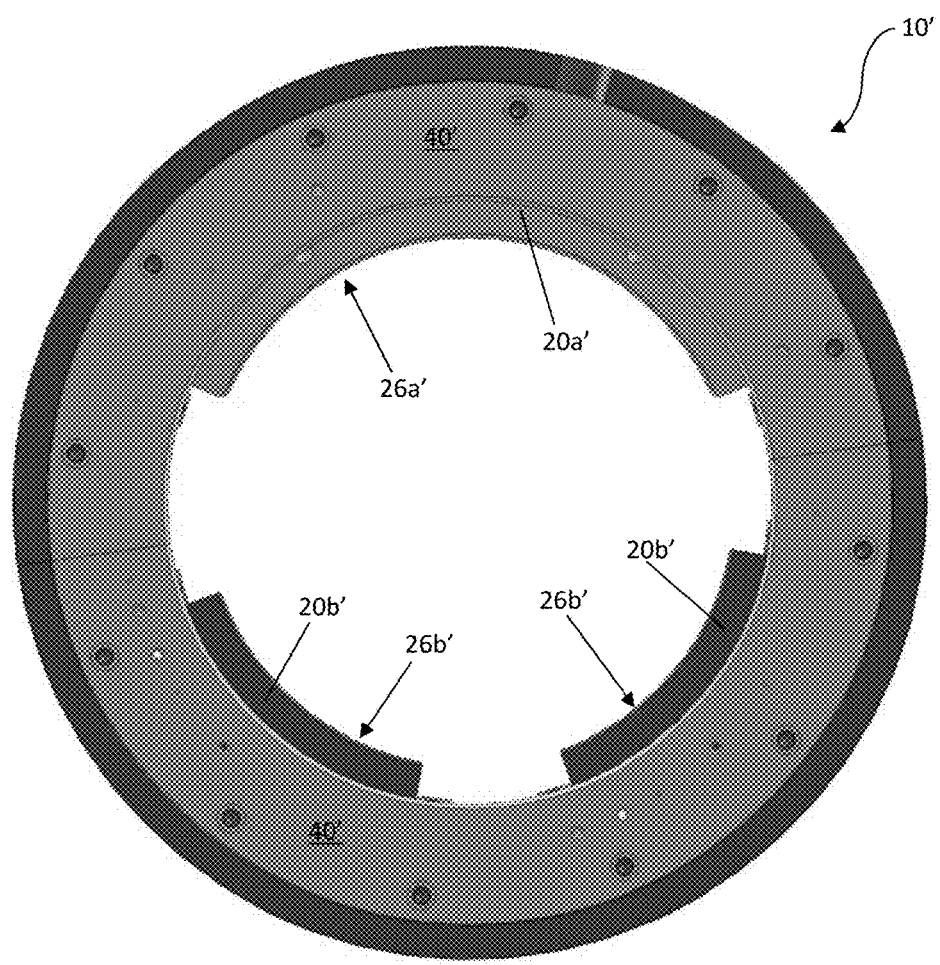
FIG. 6 provides an axial-face view of the hybrid bearing of FIG. 5.
Figure 7A:
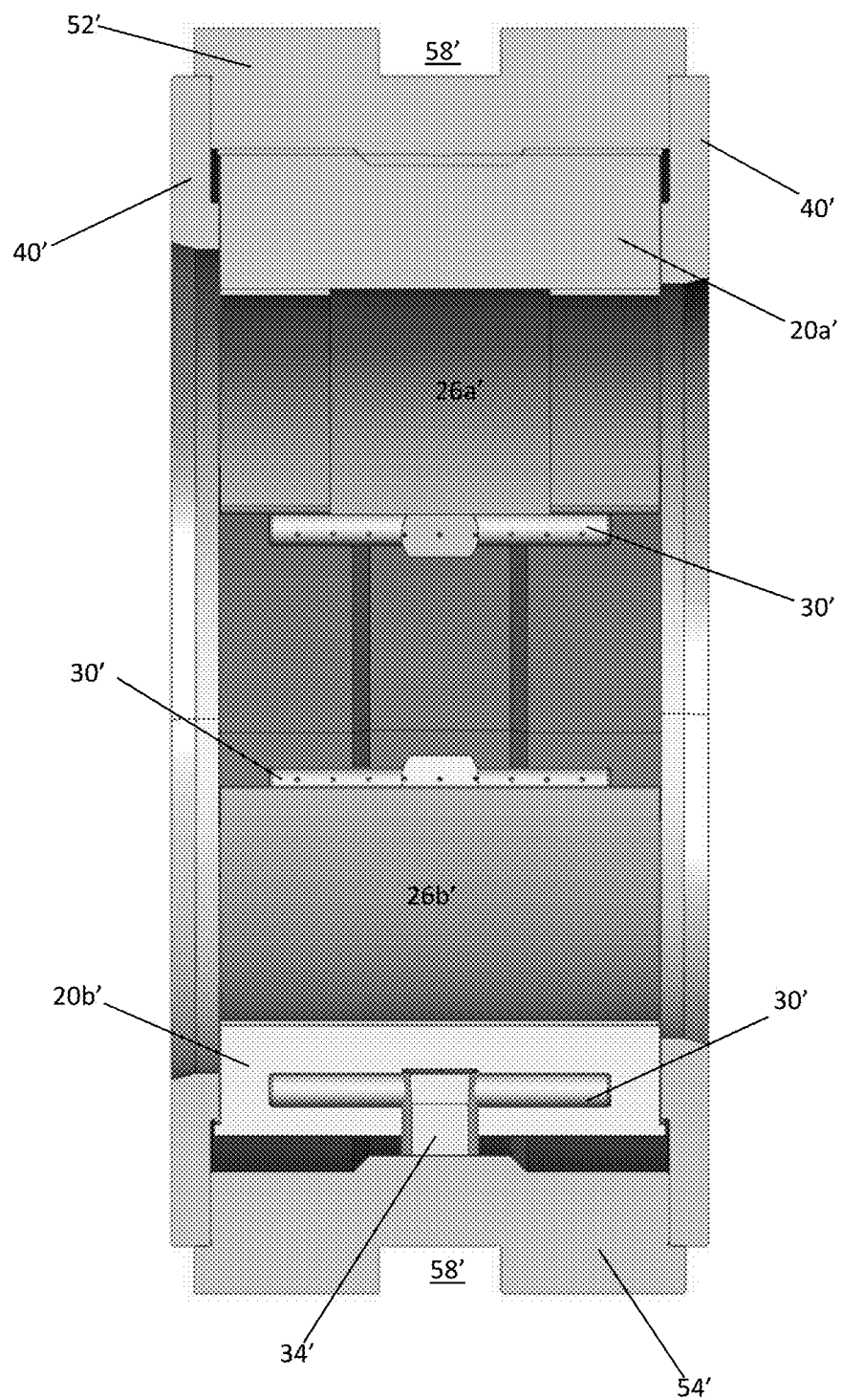
FIG. 7A provides a cross-sectional view of the hybrid bearing shown in FIGS. 5 & 6 along the longitudinal axis of the bearing.
Figure 7B:
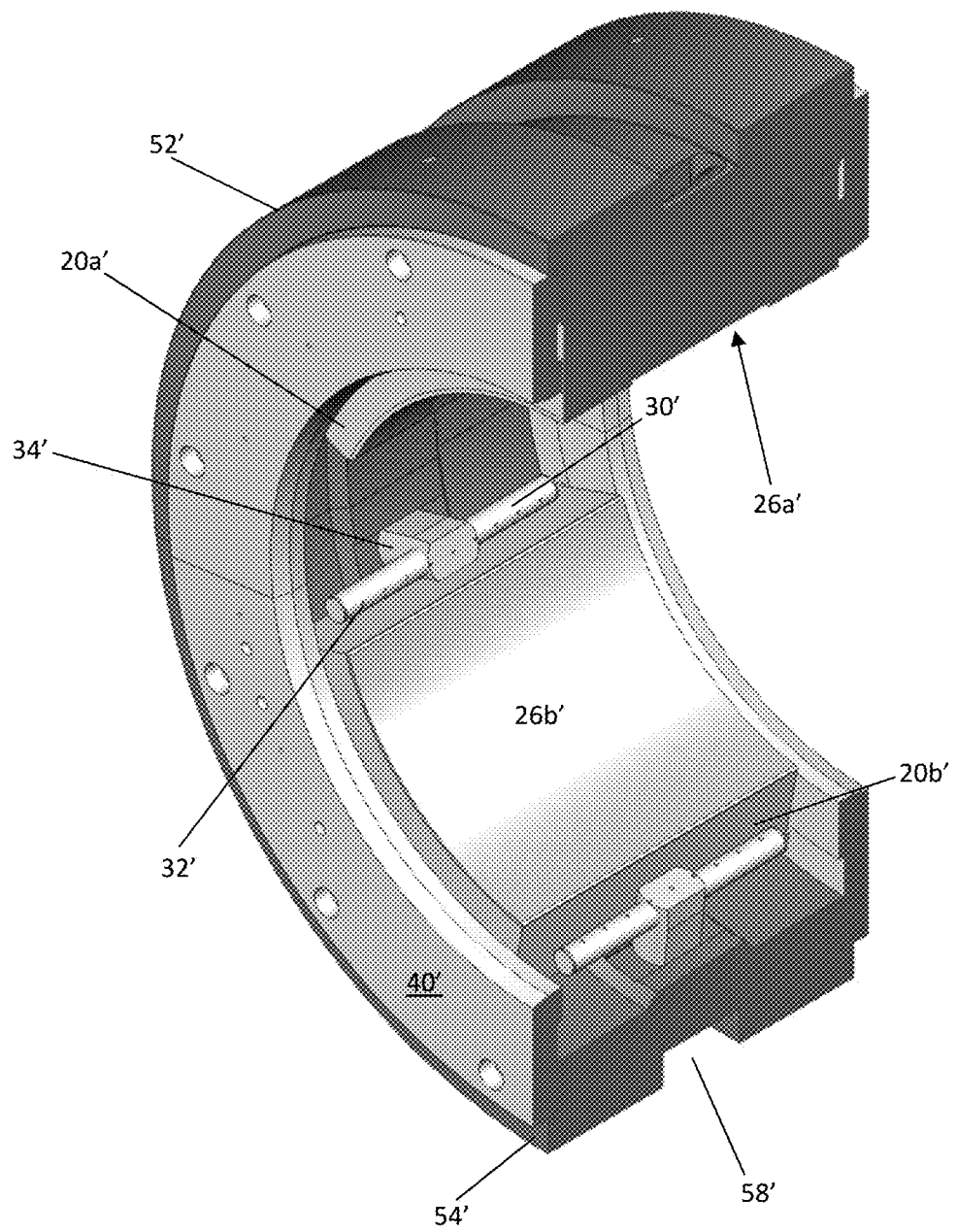
FIG. 7B provides another cross-sectional view of the hybrid bearing shown in FIGS. 5-7A.
Figure 7C:
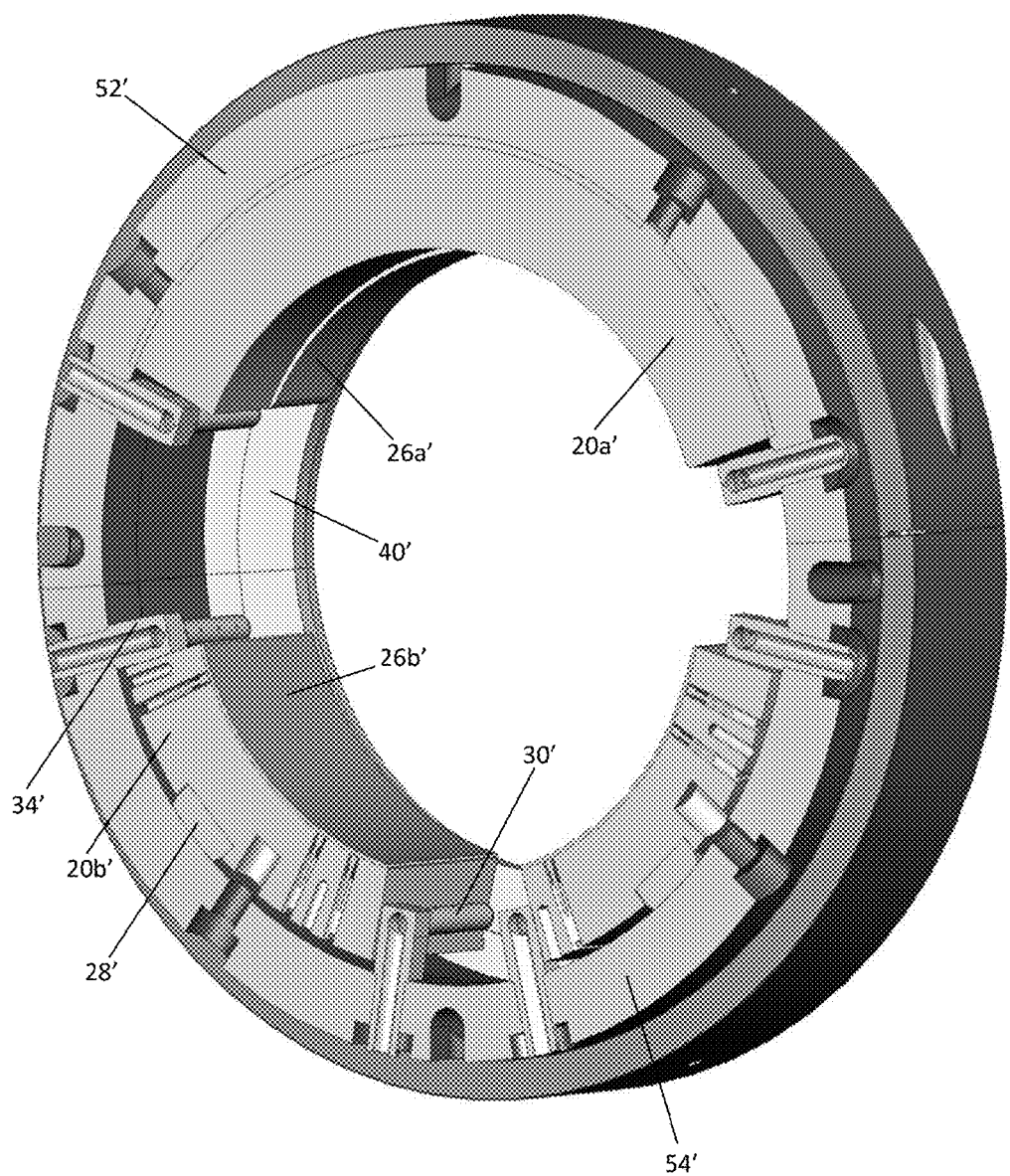
FIG. 7C provides a cross-sectional view of the hybrid bearing shown in FIGS. 5-7B along a radial plane of the bearing.
Figure 8A:
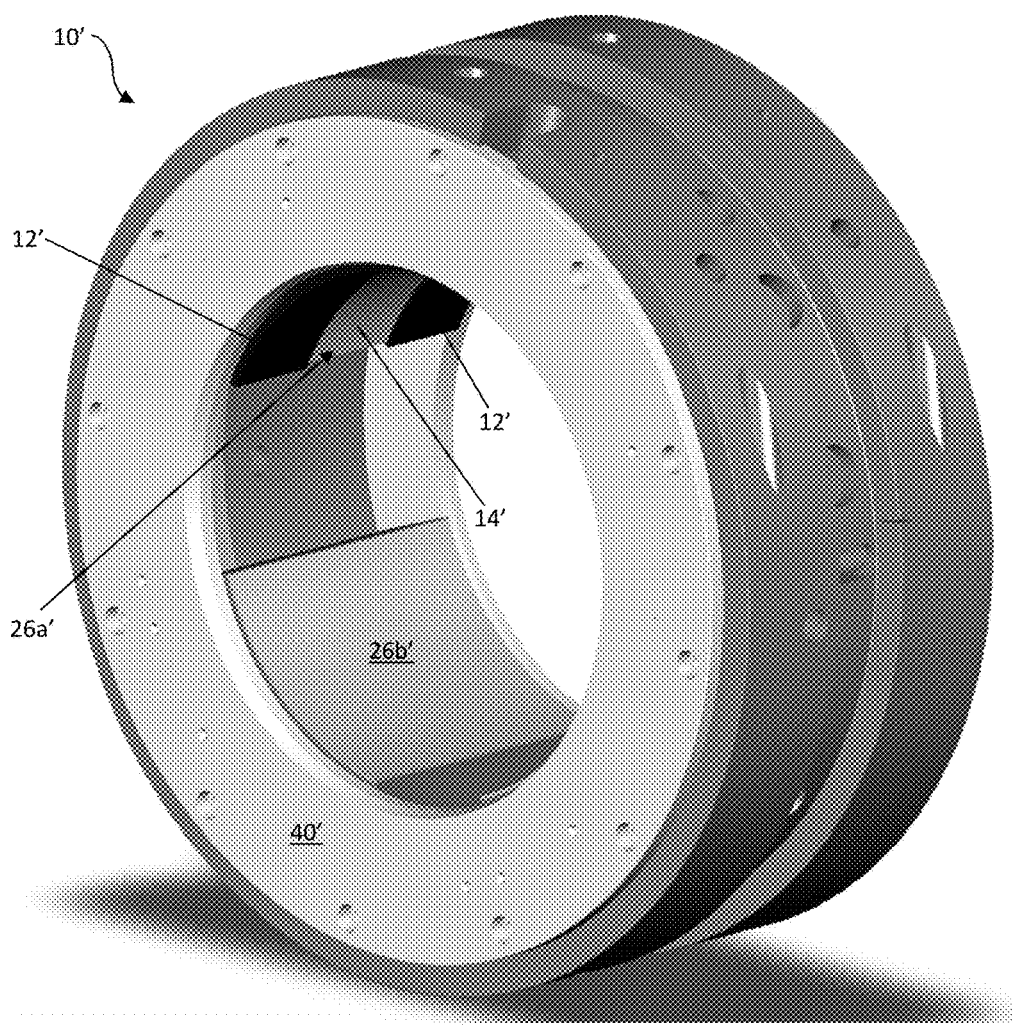
FIG. 8A provides a perspective view of another hybrid bearing with non-metallic material positioned on a fixed pad.
Figure 8B:
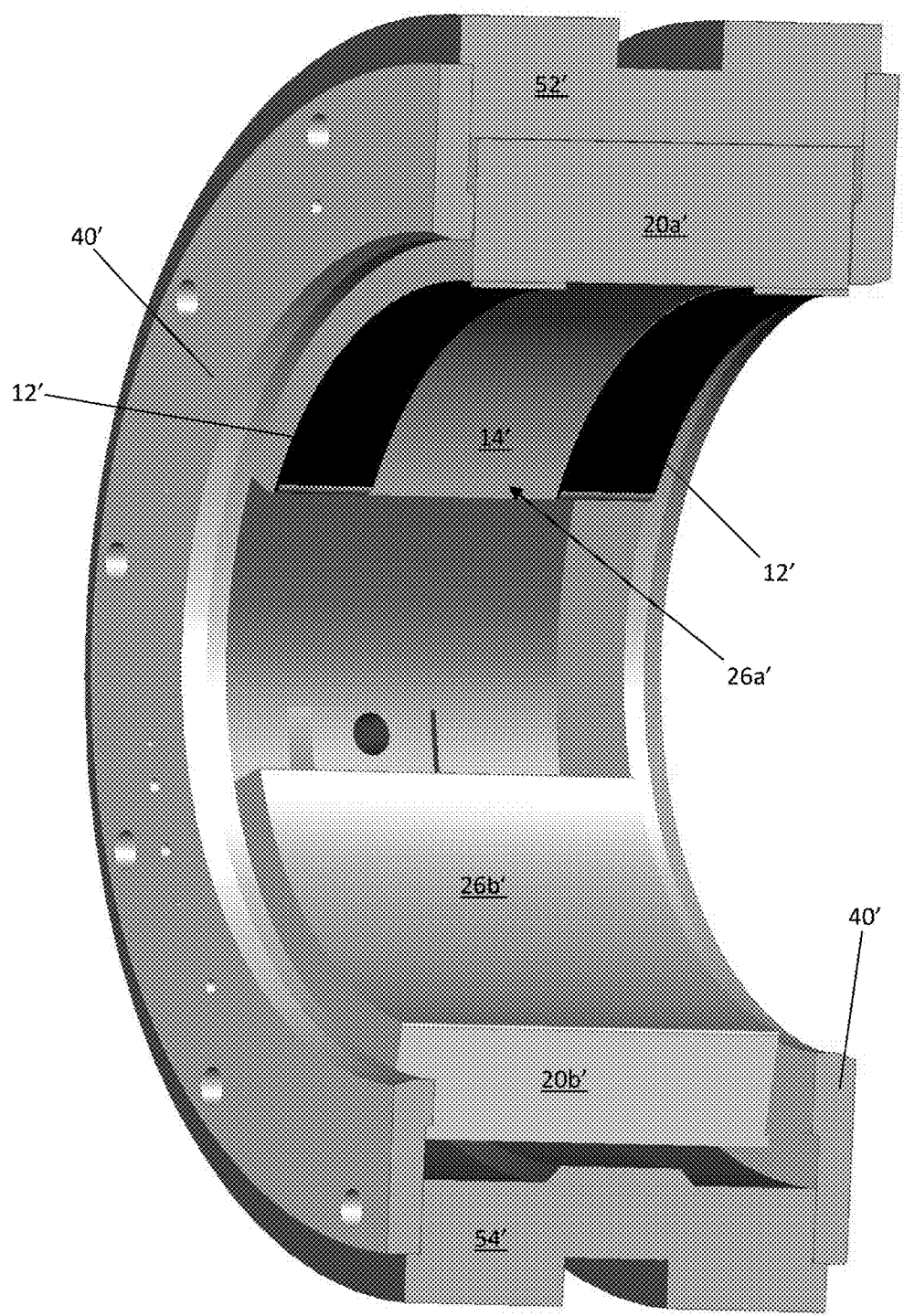
FIG. 8B provides a cross-sectional view of the hybrid bearing shown in FIG. 8A along the longitudinal axis of the bearing.
Figure 8C:
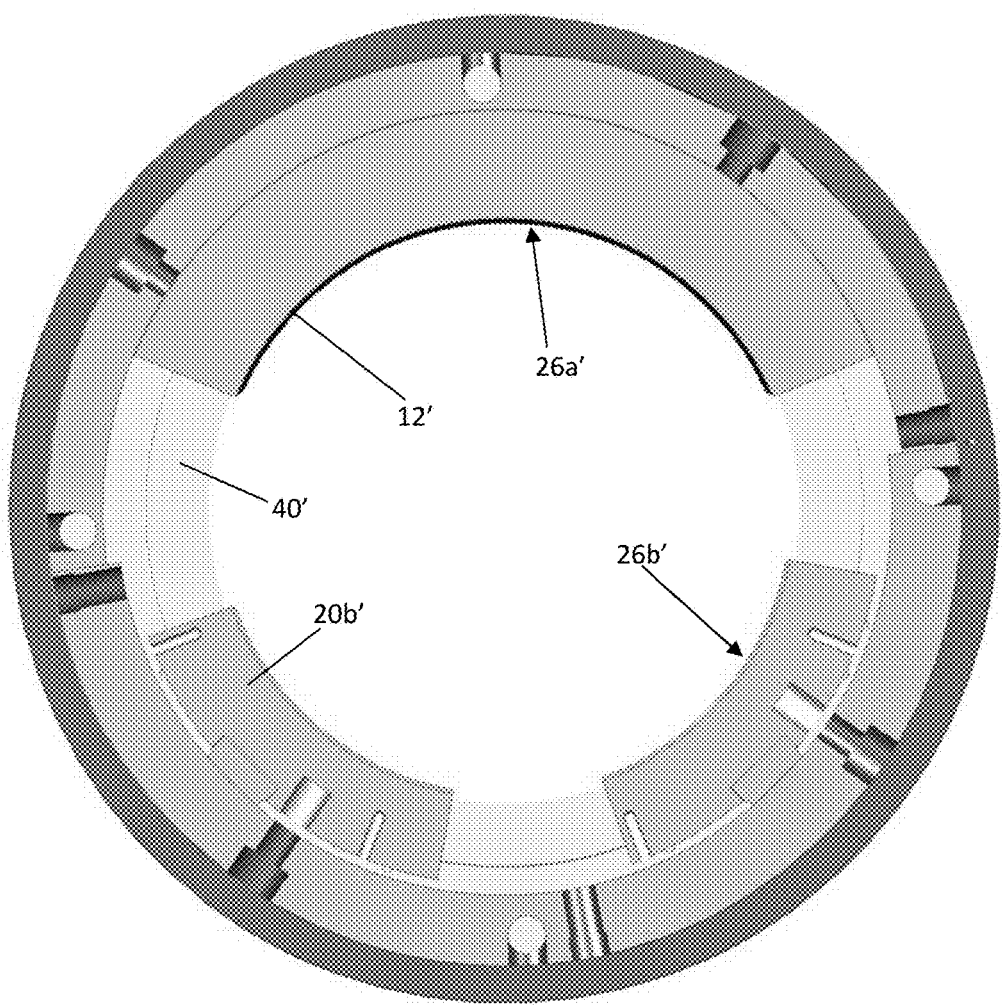
FIG. 8C provides a cross-sectional view of the hybrid bearing shown in FIGS. 8A & 8B along a radial plane of the bearing.
Figure 9:
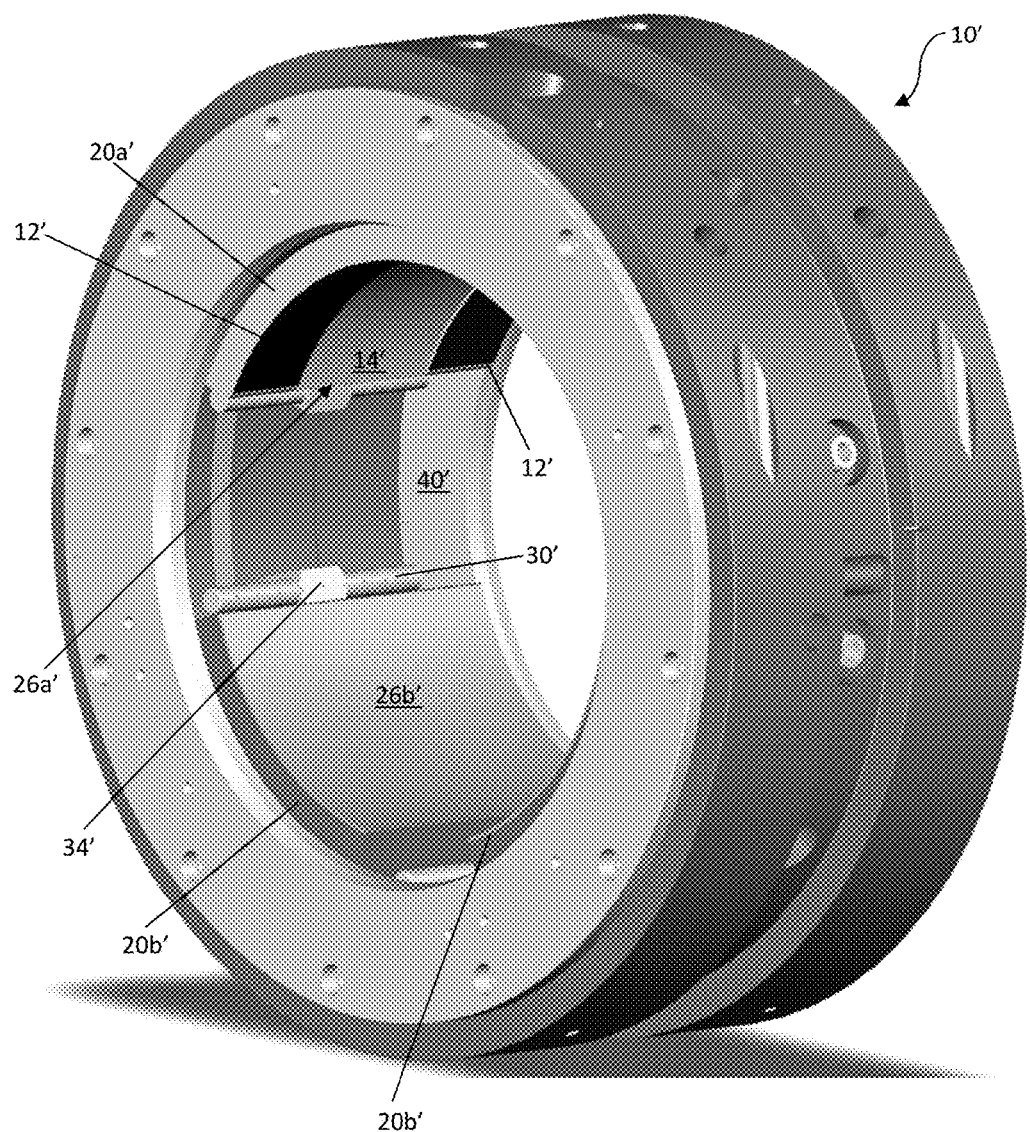
FIG. 9 provides a perspective view of another hybrid bearing with non-metallic material positioned on a fixed pad and directed lubrication.

A spray bar 30 may be positioned adjacent the trailing edge 24 of the journal pad 20, which is shown in FIG. 1 and in greater detail in FIG. 4. A spray bar 30 may also be positioned on the leading edge 22 of the journal pad 20. In the illustrative embodiment, the spray bar 30 shown at the top portion of FIG. 3 may be configured to be positioned adjacent the leading edge 22 of a journal pad 20. As shown in FIG. 2 for the illustrative embodiment, the spray bars 30 positioned closest to the twelve, three, six, and nine o'clock positions may be configured such that they are positioned adjacent the leading edge 22 of a journal pad 20, and the remaining four spray bars 30 may be configured such that they are positioned adjacent the trailing edge 24 of a journal pad 30.

Either spray bar 30 may be engaged with a shank 34, which shank 34 may in turn be engaged with a main body 50 of the trailing edge cooled bearing 10 as previously described. The spray bar 30 adjacent the trailing edge 24 of the journal pad 20 may be configured to direct fluid toward the trailing edge 24 of the journal pad 20, and in certain embodiments directly toward the trailing edge face 25, as described in further detail below. Each spray bar 30 and/or shank 34 may be formed with one or more apertures 32 therein, which apertures 32 may be configured to direct fluid flow from the interior pathway in the spray bar 30 and/or shank 34 outward in a specific direction or directions and with specific fluid flow characteristics (e.g., velocity, volumetric flow rate, etc.) with a known pressure drop across apertures 32. In certain embodiments, the spray bar 30 and/or shank 34 positioned adjacent the leading edge 22 of a journal pad 20 may be configured with two sets of apertures 32, wherein a first set of apertures 32 may be configured to remove existing lubricant from the shaft and a second set of apertures 32 may be configured to provide fresh lubricant to the active surface 26 and/or the shaft. However, other embodiments of the trailing edge cooled bearing 10 may have different configurations of apertures 32 in any spray bar 30 and/or shank 34 without limitation unless otherwise indicated in the following claims. For example, the illustrative embodiment of a trailing edge cooled bearing 10 shows the spray bar 30 associated with the leading edge 22 and the spray bar 30 associated with the trailing edge 24 as separate elements. However, in other embodiments of the trailing edge cooled bearing 10 not pictured herein, a plurality of apertures 32 in one single spray bar 30 may be configured to provide any of the functionality and/or additional functionality as the spray bars 30 and configuration of apertures therein disclosed herein. That is, a single spray bar 30 and/or apertures 32 therein (and/or shank 34 and/or apertures 32 therein) may be configured to direct fluid flow to the shaft, leading edge 22, trailing edge 24, trailing edge face 25, and/or combinations thereof without limitation unless otherwise indicated in the following claims.

The journal pad 20 may include a leading 22 and trailing edge 24 as previously described. Additionally, the journal pad 20 may include one or more profiles (not shown) on an active surface 26 of the journal pad 20. A lubricant pathway (not shown) may be (or may not be, depending on the specific embodiment of the trailing edge cooled bearing) formed in an interior portion of the journal pad 20 to direct lubricant to the active surface 26 and/or profiles formed therein under certain operating conditions. However, the scope of the present disclosure is in no way limited by the number, configuration, and/or orientation of any profiles and/or lubricant pathways in any journal pad 20 used in the trailing edge cooled bearing 10 unless otherwise indicated in the following claims. Additionally, one or more journal pads 20 may be formed with bores configured to accommodate a respective temperature sensor. However, the presence or absence of such bores and/or respective temperature sensors in no way limits the scope of the present disclosure unless otherwise indicated in the following claims, and the trailing edge cooled bearing 10 as disclosed and claimed herein extends to both journal pads 20 having temperature sensors and those without temperature sensors.

As shown, the trailing edge face 25 may be formed with one or more grooves 25a thereon. The grooves 25a may be adjacent a spray bar 30 having a plurality of apertures 32 formed along the length thereof, embodiments of which were previously described in detail above. In certain embodiments, the apertures 32 in each spray bar 30 adjacent the trailing edge face 25 may be aligned with the grooves 25a such that one aperture 32 corresponds to one groove 25a in the trailing edge face 25 and provides fluid directly to that corresponding groove 25a. These spray bars 30 and/or apertures 32 formed therein (or formed in the shank 34) may be configured to increase the velocity of lubricant impinging into the grooves in order to increase the rate and/or quantity of heat transfer between the lubricant and the journal pad 20.

The grooves 25a may serve to increase the surface area on which the lubricant may act to exchange thermal energy with the pad 20. Generally, deeper grooves 25a provide more surface area for heat exchange. However, removing material from that portion of the journal pad 20 may compromise the stiffness and/or structural integrity of the journal pad 20. Accordingly, the optimal configuration for the grooves 25a will vary from one embodiment of the trailing edge cooled bearing 10, and the optimal configuration may involve balancing the desired heat transfer with the desired structural integrity and/or resistance to deflection of a journal pad 20. Therefore, the specific number, orientation, relative position, shape, geometry, dimensions, configuration, etc. of a groove 25a or grooves 25a may vary from one embodiment of the cooled bearing 10 to the next, and is in no way limiting to the scope of the present disclosure unless otherwise indicated in the following claims. Additionally, the grooves 25a formed in any given trailing edge face 25 need not be identical and/or uniform. The spray bar 30, shank 34, and/or the arrangement of apertures 32 thereon may be configured to efficiently deliver fluid to the grooves 25a such that the desired amount of heat transfer is achieved for a given fluid velocity passing over the groove 25a configuration (e.g., via different spray patterns, etc.).

Even though the specific number, orientation, relative position, shape, geometry, dimensions, configuration, etc. of the trailing edge cooled bearing 10, hybrid bearing 10', and various elements thereof may vary from one embodiment of the cooled bearing 10 to the next, one specific illustrative embodiment will be described, wherein the listed dimensions are for illustrative purposes only. For a shaft having an outside diameter of approximately 580 millimeters (mm), the outside diameter of each end plate 40 may be 1000 mm, and the inside diameter thereof may be 590 mm. The axial width of the main body 50 may be 493 mm and the axial width of each end plate 40 may be 40 mm. The outside diameter of the main body 50 may be 1100 mm.

The clearance between the active surface 26 of each journal pad 20 and the shaft may be 0.05 mm. Each journal pad 20 may be 200 mm thick in the radial dimension and encompass an arc of 20 to 90 degrees based on the rotational axis of the shaft. The axial dimension of each journal pad 20 may be 520 mm, which in conjunction with the thickness of each journal pad 20 may determine with surface area of the trailing edge face 25.

Illustrative Aspects of a Hybrid Bearing

Referring now generally to FIGS. 5-12, and more specifically to FIGS. 5-7C, FIG. 5 provides a perspective view of an illustrative hybrid bearing 10' before any non-metallic material 12' has been positioned on any of the pads 20a', 20b'. In an aspect, a hybrid bearing 10' may be configured with purposeful material selection on one or more active surfaces 26a', 26b' of one or more fixed pads 20a' and/or tilt pads 20b', as described in further detail below, to ensure safer operation, increased longevity, and eliminating and/or mitigating lift features compared to bearings found in the prior art for a particular application. These varying materials may be incorporated with existing bearing features, which bearing features include but are not limited to those shown in FIGS. 1-4 (and previously described above) and 5-12 (described in detail below), as well as anti-rotation features, lift features, pivot features, mechanisms to secure the fixed pad(s), and/or alignment features of a bearing without limitation unless so indicated in the following claims.

In an aspect, advanced materials (which advanced materials include but are not limited to engineering polymers and hard-surface materials unless so indicated in the following claims) may be employed in conjunction with other aspects of a bearing to achieve various advantages. Certain aspects of a hybrid bearing 10' that may compliment the advanced material may include but are not limited to unless otherwise indicated in the following claims: directed lubrication spray bars 30' and/or lubrication pockets, fixed pads 20a' adjacent an upper or lower half of the hybrid bearing 10', tilt pads 20b' adjacent an upper or lower half of the hybrid bearing 10', surface feature(s) 27' on an active surface 26a', 26b', large clearance end plates 40', and/or combinations thereof) to allow for removal of hydrostatic lift features in one or more pads 20a', 20b' and/or to allow for higher loads, temperatures, and/or pressures at start-up/stop and during operation. It is contemplated that removing hydrostatic lift features, allowing higher loads and/or temperatures may reduce power loss while simultaneously ensuring proper bearing life, all of which may be achieved via a hybrid bearing 10' (with alternate and/or non-metallic materials 12' as described in further detail below). Additionally, it is contemplated that a hybrid bearing 10' (with alternate and/or non-metallic materials 12' as described in further detail below) may allow for more momentary contact between a rotating shaft and the pads 20a', 20b' without causing failure, as well as being less susceptible to imperfect boundary lubrication. Generally, it is contemplated that a fixed pad 20a' on the upper portion of the hybrid bearing 10' may both reduce power losses and provide a bearing surface for perturbations.

Generally, it is contemplated that a hybrid bearing 10' may increase the overall efficiency of machinery having rotating shafts, thereby reducing power consumption of the machinery. Generally, it is further contemplated that advanced material selection for a hybrid bearing 10' may allow for higher unit loads, thinner films (in fluid-film applications), and/or the removal of features on the active surface 26a', 26b' of a pad 20a', 20b' compared to prior art bearings in a corresponding application. Accordingly, in an aspect a hybrid bearing 10' (with alternate and/or non-metallic materials 12' as described in further detail below) allows for an even thinner film and/or higher operating temperatures compared to bearings found in the prior art.

As shown, the hybrid bearing 10' may comprise a main body 50', which may be formed as a top portion 52' and a bottom portion 54' in a manner as previously described above. The main body 50' may be engaged with an end plate 40' on either axial face thereof. Although shown engaged via a plurality of screws and corresponding threaded holes, any suitable structure and/or method may be used to engage and/or secure each end plate 40' with the main body 50', including but not limited to mechanical fasteners (e.g., screws, bolts, etc.), interference fits, chemical adhesives, welding, and/or combinations thereof, or with one or both end plates 40' being integral to the main body 50' without limitation unless otherwise indicated in the following claims.

Still referring to FIGS. 5-7C, the main body 50' of the hybrid bearing 10' may further may also be formed with an annular groove 58' on the exterior surface thereof. The annular groove 58' may be in fluid communication with one or more shanks 34', which in turn may be in fluid communication with one or more spray bars 30' in a manner as previously described above. As such, lubricant (which may be pressurized using any lubricant supply method and/or apparatus suitable for the particular application of the hybrid bearing 10') may be supplied to an annular groove 58' in the main body 50', which lubricant may pass through the interior of a shank 34' and to a spray bar 30' engaged with that shank 34' such that the lubricant contacts one or more pads 20a', 20b'.

As shown at least in FIGS. 5-7C, the hybrid bearing 10' may be comprised of at least one fixed pad 20a' having a fixed pad active surface 26a' and at least one tilt pad 20b' having a tilt pad active surface 26b'. Although the hybrid bearing 10' shown in FIGS. 5-7C may be configured with one fixed pad 20a' (which generally may be positioned adjacent the upper half of the hybrid bearing 10') and two tilt pads 20b' (which generally may be positioned adjacent the lower half of the hybrid bearing 10'), other numbers and configurations of fixed pads 20a' and tilt pads 20b' may be employed without limitation unless so indicated in the following claims. For example, a hybrid bearing 10' may be configured with two tilt pads 20b' and two fixed pads 20a', three tilt pads 20b' and one fixed pad 20a', or with four tilt pads 20b' and two fixed pads 20a'. Additionally, the tilt pads 20b' may be positioned adjacent the upper half of the hybrid bearing 10' and the fixed pads 20a' may be positioned adjacent the lower half of the hybrid bearing 10' in other illustrative embodiments without limitation unless so indicated in the following claims.

Generally, a tilt pad 20b' may be moveable with respect to the main body 50' in at least one axis of freedom. In the illustrative embodiments shown herein, each tilt pad 20b' may be engaged with the main body 50' via a button configuration. In such an embodiment, the tilt pad 20b' may be formed with a button 28' on the circumferentially exterior surface thereof, wherein that button 28' tilts on the inner diameter of the main body 50'. Such a configuration allows the tilt pads 20b' to move and/or tilt with respect to the main body 50'. However, other embodiments of the hybrid bearing 10' may use other features to allow for tilt pad 20b' movement with respect to the main body 50' (e.g., axial ridges formed in the main body 50' that engage the tilt pad 20b' or ball 28 and socket 56 arrangement in which the ball may be formed in either the body 50 or the tilt pad 20 and the socket in either tilt pad 20 or the body 50 as shown above in FIGS. 2 and 3 and previously described). Accordingly, the scope of the present disclosure is in no way limited by the method and/or structure used to allow relative movement and/or tilting between the main body 50' and any tilt pad 20b' unless otherwise indicated in the following claims.

As discussed above, a shank 34' and associated spray bar 30' having one or more apertures 32' formed therein may be positioned adjacent a leading or trailing edge of a fixed pad 20a' and/or tilt pad 20b'. Different configurations of hybrid bearings 10' configured with a plurality of spray bars 30' are shown in FIGS. 9-11 and 13, wherein each hybrid bearing 10' may be configured with one or more spray bars 30' adjacent either a fixed pad 20a' and/or adjacent a tilt pad 20b'. However, the optimal placement, configuration, and/or number of spray bars 30' may vary from one application of the hybrid bearing 10' to the next, and in some applications of a hybrid bearing 10' a spray bar 30' may not be required (as shown at least in FIGS. 8A-8C and 12A-12C). Accordingly, the presence/absence of a spray bar 30', number, orientation, and/or configuration therefore in no way limiting to the scope of the present disclosure unless so indicated in the following claims.

In one aspect of a hybrid bearing 10' shown in FIGS. 5-7C, one or more tilt pads 20b' and/or fixed pads 20a' may be coated with a non-metallic material 12', though FIGS. 5-7C show the hybrid bearing 10' without such non-metallic material 12'. Generally, the non-metallic material 12' may be configured as a polymer material or a ceramic material. Alternatively, one or more tilt pads 20b' and/or fixed pads 20a' may be constructed entirely of a non-metallic material 12' (as shown in FIG. 13 and described further below), or with a non-metallic material 12' insert. In another aspect shown at least in FIGS. 11-12C, both a fixed pad 20a' and a tilt pad 20b' may be coated with a non-metallic material 12'; or, alternatively, both a fixed pad 20a' and a tilt pad 20b' may be constructed of a non-metallic material 12' or with a non-metallic material 12' insert. The specific location, configuration, and/or construction of the non-metallic material 12' on a pad 20a', 20b' in no way limits the scope of the present disclosure unless so indicated in the following claims.

In another aspect of a hybrid bearing 10', a non-metallic material 12' may be positioned on all or a portion of the fixed pad active surface 26a' and/or tilt pad active surface 26b'. For example, in an aspect of the hybrid bearing 10' shown in FIGS. 8A-8C, a non-metallic material 12' may be positioned on each side of the fixed pad active surface 26a', such the fixed pad active surface 26a' comprises at least three distinct portions, wherein each portion constitutes approximately one third of the surface area of the active surface 26a', 26b'. As shown, metallic material 14' may be positioned between outside portions each having a non-metallic material 12' positioned thereon. It is contemplated that the portion of the fixed pad active surface 26a' having metallic material 14' may be slightly recessed (i.e., have a larger diameter by 0.01 mm to 5 mm) than either adjacent portion of the fixed pad active surface 26a' having a non-metallic material 12' thereon. It is contemplated that such a configuration may have various benefits, including but not limited to reduction in power loss unless otherwise indicated in the following claims. Other proportions among the three portions of a pad active surface 26a', 26b' may be employed without limitation unless so indicated in the following claims. For example, in one illustrative embodiment two portions each constituting one-fourth of the active surface 26a', 26b' may be separated by another portion of the active surface 26a', 26b constituting one-half of the active surface 26a', 26b'. In the same manner and without limitation unless so indicated in the following claims, a tilt pad active surface 26b' may be configured in with three distinct portions. As another illustrative example, non-metallic material 12' may be positioned across the entire axial length of the active surface 26a', 26b' such that the metallic material 14' is not present on the active surface 26a', 26b'. For an illustrative embodiment wherein one of the pads 20a', 20b' is constructed entirely of a non-metallic material 12', the fixed pad 20a' may have a recessed section within the fixed pad active surface 26a' into the non-metallic material 12.

The non-metallic material 12' may be a coating applied to another material (e.g., applied via a spray), an insert (which may be chemically bonded to the metallic backing material of the pad 20a', 20b'), or a separate feature constructed of a non-metallic material 12' that is secured to another material of the pad 20a', 20b' (for example, babbitt material) via chemical or mechanical bonding. In another illustrative embodiment the non-metallic material 12' may be molded to the metallic backing material of the pad 20a', 20b'. Although the various figures show the non-metallic material 12' extending from the leading edge 22a', 22b' to the trailing edge 24a', 24b', in other illustrative embodiments of the hybrid bearing 10' the non-metallic material 12' may terminate prior to the leading edge 22a', 22b' and/or the trailing edge 24a', 24b'. According, the specific location, shape, dimensions, and/or configuration of the non-metallic material 12' on an active surface 26a', 26b' in no way limits the scope of the present disclosure unless so indicated in the following claims.

It is contemplated that for some applications, the thickness (i.e., the radial dimension) of the non-metallic material 12' may be between $1/10{,}000$ and $1/4$ of the entire thickness of the pad 20a', 20b'. For non-metallic materials 12' comprised of a ceramic, it is contemplated that for some applications it may be advantageous to configure the pads 20a', 20b' such that the thickness of the non-metallic material 12' is $1/10{,}000$ to $1/8$ of the entire thickness of the pad 20a', 20b'. For non-metallic materials 12' comprised of a polymer, it is contemplated that for some applications it may be advantageous to configure the pads 20a', 20b' such that the thickness of the non-metallic material 12' is $1/100$ to $1/8$ of the entire thickness of the pad 20a', 20b'. For other applications it is contemplated that it may be advantageous to configure the pads 20a', 20b' such that the thickness of the non-metallic material 12' is $1/32$ to $1/12$ of the entire thickness of the pad 20a', 20b'.

Generally, the hybrid bearing 10' shown in FIGS. 9, 11, & 12A-12C may be configured with a fixed pad 20a' and tilt pads 20b' (and other features, such as the end plates 40' and main body 50') similar to the fixed pad 20a' and tilt pads 20b' described above for the hybrid bearing in FIGS. 8A-8C. However, the hybrid bearing 10' shown in FIG. 9 may be configured with one or more spray bars 30', also as previously described above.

Figure 10:
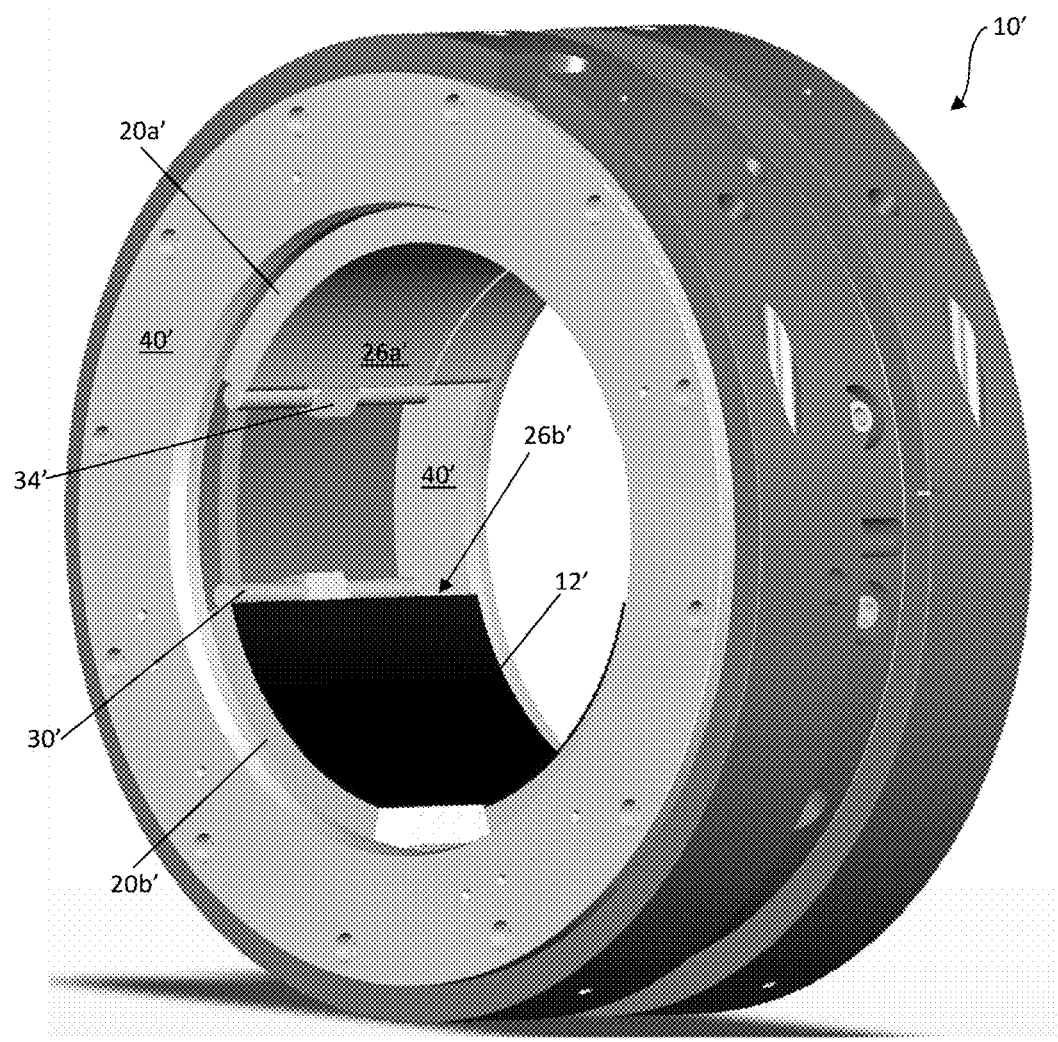
FIG. 10 provides a perspective view of another hybrid bearing with non-metallic material positioned on a tilt pad.

Generally, the hybrid bearing 10' shown in FIG. 10 may be configured with a standard fixed pad 20a'. However, both tilt pads 20b' may be configured with a non-metallic material 12' on a portion of the tilt pad active surface 26b'. As shown, the non-metallic material 12' may cover the entire area of the tilt pad active surface 26b'. However, in other embodiments the non-metallic material 12' may be differently configured, and the tilt pad active surface 26b' may be comprised of various portions having non-metallic material 12' and metallic material 14' thereon without limitation unless so indicated in the following claims.

Figure 11:
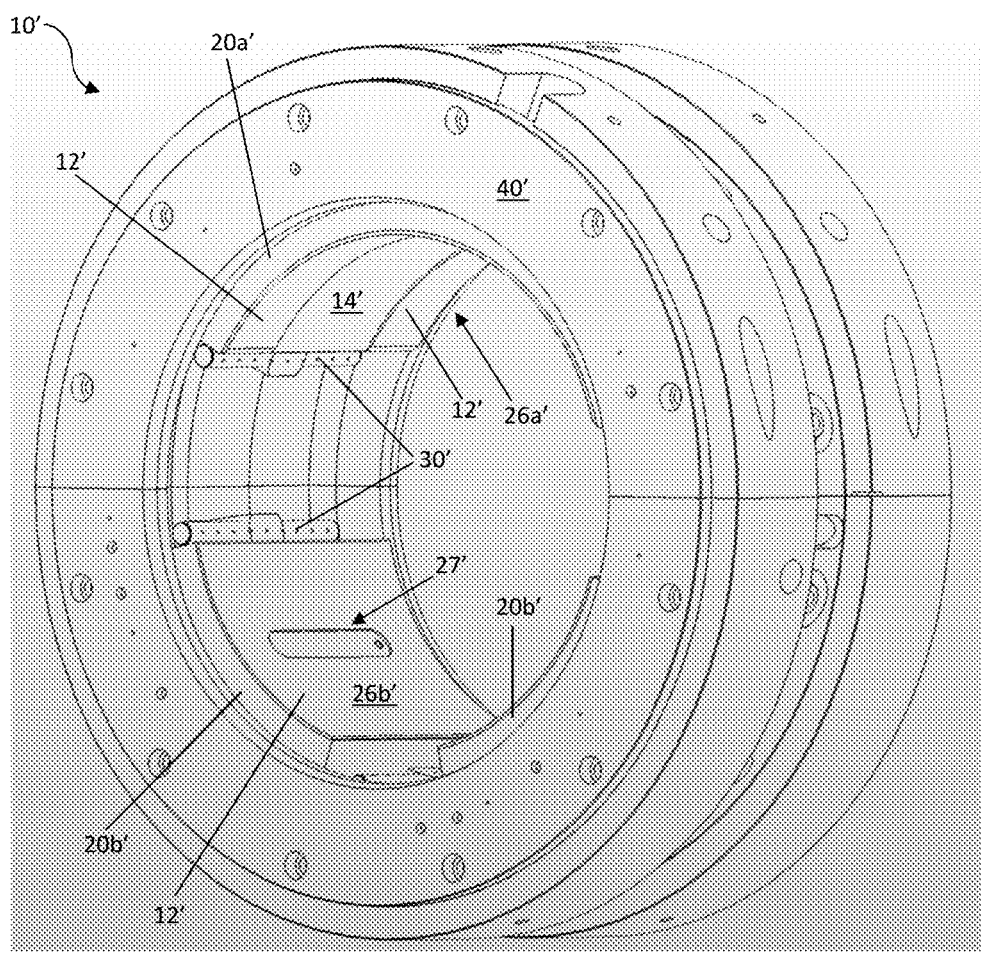
FIG. 11 provides a wire frame drawing of a hybrid bearing having directed lubrication and a surface feature on a tilt pad.

As mentioned, the hybrid bearing 10' shown in FIG. 11 may have a fixed pad 20a' (and other features, such as the end plates 40' and main body 50') similar to the fixed pad 20a' and tilt pads 20b' described above for the hybrid bearing in FIGS. 8A-8C. However, in another aspect of a hybrid bearing 10' shown in FIG. 11, the tilt pad active surface 26b' may be configured such that it includes a surface feature 27' thereon. Although FIG. 11 shows a simple lift pocket for a surface feature 27', the scope of the present disclosure is not so limited and extends to any advantageous surface feature 27' without limitation unless so indicated in the following claims. Additionally, the hybrid bearing 10' shown in FIG. 11 may be configured with a trailing edge cooling feature for one or more pads 20a', 20b' therein without limitation unless so indicated in the following claims.

Figure 12A:
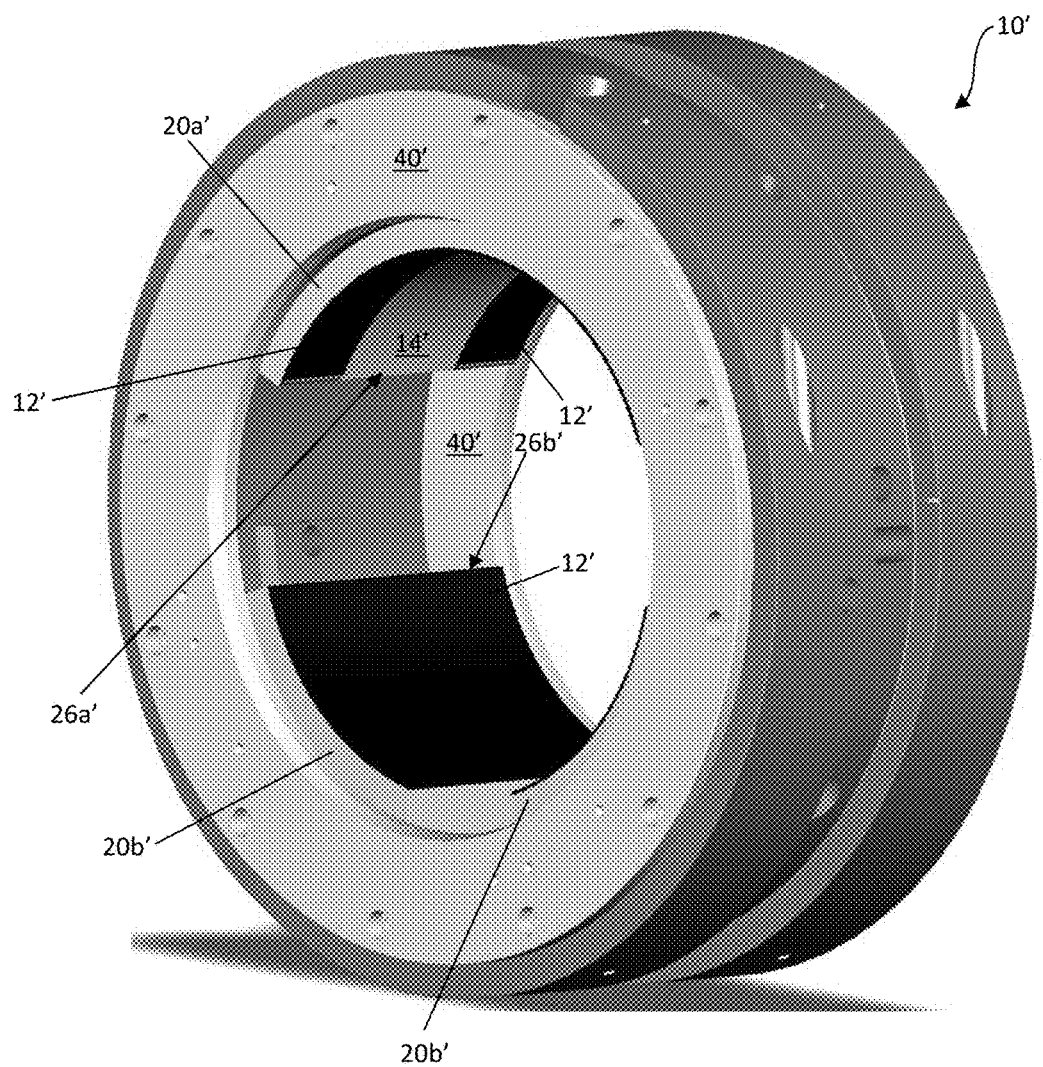
FIG. 12A provides a perspective view of another hybrid bearing with non-metallic material positioned on a fixed pad and a tilt pad.
Figure 12B:
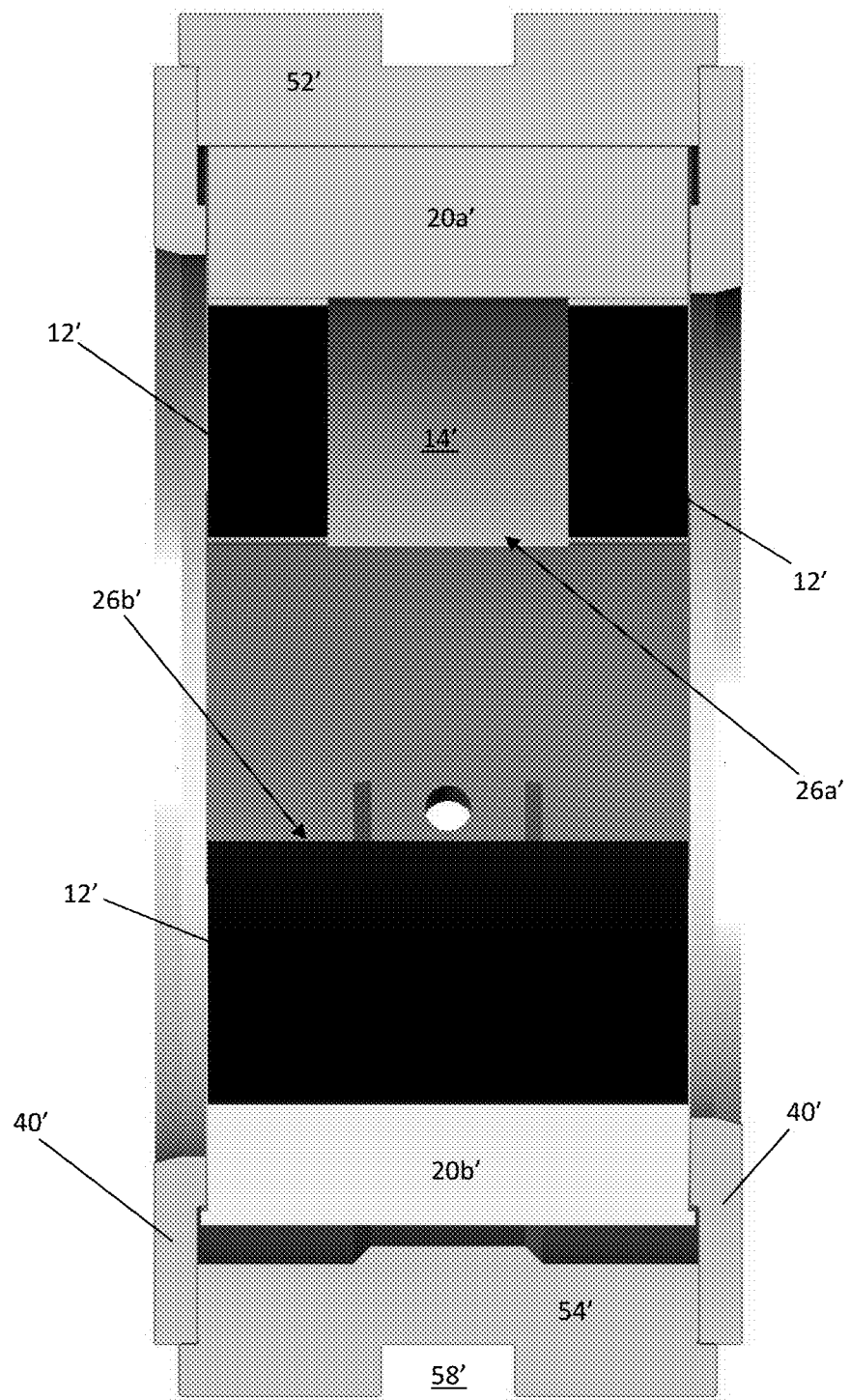
FIG. 12B provides a cross-sectional view of the hybrid bearing shown in FIG. 12A along the longitudinal axis of the bearing.
Figure 12C:
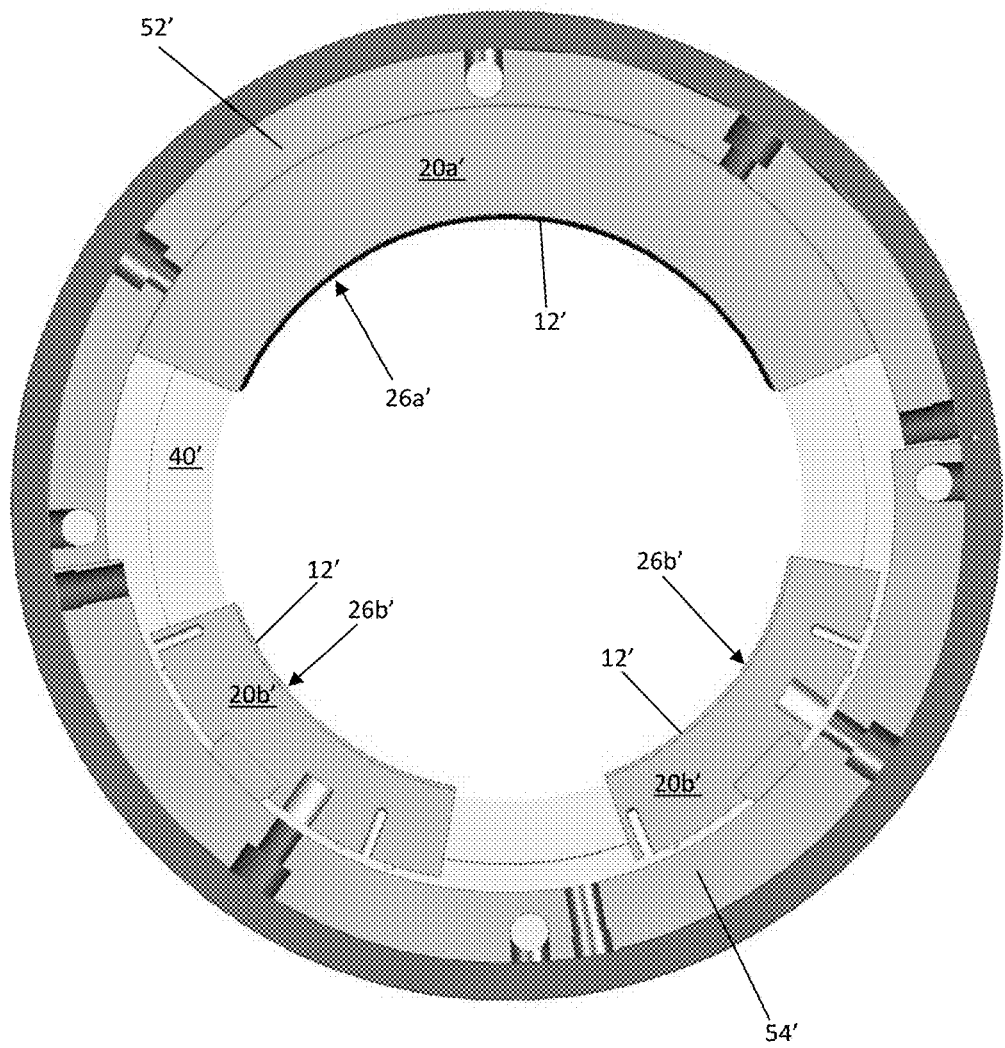
FIG. 12C provides a cross-sectional view of the hybrid bearing shown in FIGS. 12A & 12B along a radial plane of the bearing.
Figure 13:
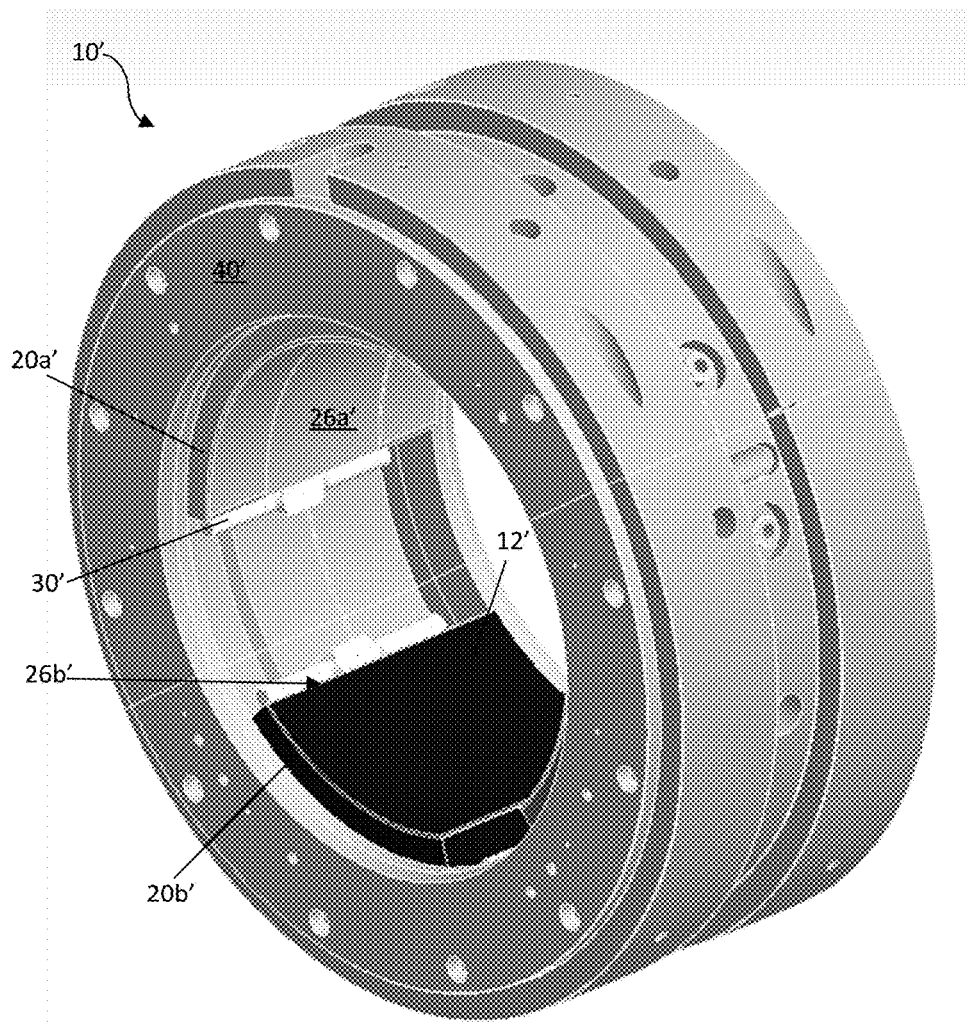
FIG. 13 provides a perspective view of another hybrid bearing wherein a tilt pad may be constructed of a non-metallic material.

The hybrid bearing 10' shown in FIGS. 12A-12C may have a fixed pad 20a' (and other features, such as the end plates 40' and main body 50') similar to the fixed pad 20a' and tilt pads 20b' described above for the hybrid bearing in FIGS. 8A-8C. However, the hybrid bearing shown in FIGS. 12A-12C may also have one or more tilt pads 20b' that may be configured with a non-metallic material 12' on a portion of the tilt pad active surface 26b' in a manner as previously described for the hybrid bearing 10' shown in FIG. 10. As shown, the non-metallic material 12' may cover the entire area of the tilt pad active surface 26b'. However, in other embodiments the non-metallic material 12' may be differently configured, and the tilt pad active surface 26b' may be comprised of various portions having non-metallic material 12' and metallic material 14' thereon without limitation unless so indicated in the following claims.

Generally, the hybrid bearing 10' shown in FIG. 13 may be configured with a standard fixed pad 20a'. However, both tilt pads 20b' may be configured such that they are constructed entirely of a non-metallic material 12'. Accordingly, the non-metallic material 12' may cover the entire area of the tilt pad active surface 26b'. However, in other embodiments the non-metallic material 12' may be differently configured, and the tilt pad active surface 26b' may be comprised of various portions having non-metallic material 12' and metallic material 14' thereon without limitation unless so indicated in the following claims.

In an aspect, the non-metallic material 12' may be configured as a polyether ether ketone (PEEK) based polymer. In another hybrid bearing 10', the non-metallic material 12' may be comprised of polytetrafluoroethylene (PTFE). In still other hybrid bearings 10' the non-metallic material 12' may be comprised of a different polymer, including but not limited to fluorinated ethylene propylene, perfluoroalkoxy alkanes, ethylene tetrafluoroethylene, polyvinylidene fluoride or polyvinylidene difluoride, liquid-crystal polymers, polyphenylene sulfide, polyamides (e.g., a nylon), polyimides, acetals, other suitable polymers for a particular application of the hybrid bearing 10', and/or combinations thereof unless so indicated in the following claims. Additionally, a non-metallic material 12' may be filled with, blended with, and/or have other materials embedded therein, including but not limited to other polymers, fibers (natural or synthetic), other materials (e.g., solid lubricants), and/or combinations thereof which may result better tribological properties and/or higher strength without limitation unless otherwise indicated in the following claims. In testing, PEEK-based polymers have shown satisfactory performance when used with thinner films at higher temperatures compared to bearings of the prior art. Allowing for thinner films at higher temperatures the design of the hybrid bearing 10' may allow for higher unit loads, and may also allow for lower viscosity fluids, which may result in a reduction in power loss associated with the hybrid bearing 10' when compared to bearings in the prior art.

It is contemplated that at least one pad 20a', 20b' in a hybrid bearing 10' may be configured with a non-metallic material 12' thereon, wherein the non-metallic material 12' may be comprised of a ceramic. For example, in an aspect of the hybrid bearing 10' shown in FIG. 10, the tilt pad 20b' with a surface feature 27' formed thereon may be constructed with coating made of a non-metallic material 12' comprised of a ceramic, constructed with an insert made of a non-metallic material 12' comprised of a ceramic, or the entire tilt pad 20b' may be constructed from a non-metallic material 12' comprised of a ceramic without limitation unless so indicated in the following claims. Additionally, the hybrid bearings 10' shown herein may be constructed such that a tilt pad 20b' and/or fixed pad 20a' may be constructed with coating made of a non-metallic material 12' comprised of a ceramic, constructed with an insert made of a non-metallic material 12' comprised of a ceramic, or the entire tilt pad 20b' and/or fixed pad 20a' may be constructed from a non-metallic material 12' comprised of a ceramic without limitation unless so indicated in the following claims.

The non-metallic material 12' comprised of a ceramic may be comprised of any suitable ceramic (e.g., nano and/or ultranano ceramic materials comprised of aluminum nitride, boron nitride, cordierite, silicon, silicon carbide, diamond, nano-, ultranano-, polycrystalline diamond, graphite, tungsten carbide, cobalt-chromium alloys, etc.) and/or any suitable material having certain characteristics of a non-metallic material 12' (e.g., requisite hardness, strength, facture toughness, wear resistance, anti-static, frictional behavior, etc.) without limitation unless so indicated in the following claims. The optimal non-metallic material 12' may vary from one application of the hybrid bearing 10' to the next and is therefore in no way limiting to the scope of the present disclosure unless so indicated in the following claims. The specific location of the non-metallic material 12' on a pad 20a', 20b' in no way limits the scope of the present disclosure unless so indicated in the following claims.

In other aspects of a hybrid bearing 10', the non-metallic material 12' may be differently placed on one or more pads 20a', 20b' in conjunction with one another on a given pad 20a', 20b' or separately on different pads 20a', 20b' without limitation unless so indicated in the following claims. The specific location of the non-metallic material 12' on an active surface 26a', 26b' in no way limits the scope of the present disclosure unless so indicated in the following claims regardless of whether the non-metallic material 12' is comprised of a polymer, a ceramic, or a different non-metallic material 12'.

In prior art bearings, oftentimes lift pockets were required to be formed in the bearing pads, and pressurized fluid from a source external to the bearing were required to prevent bearing damage and potentially failure when the load on the bearing was above a predetermined amount. It is contemplated that use of a non-metallic material 12' on all or a portion of the fixed pad active surface 26a' and/or tilt pad active surface 26b' may lessen or negate the need for lift pockets and/or pressurized fluid from a source external to the bearing.

The number, configuration, dimensions, geometries, and/or relative locations of the non-metallic material 12', journal pads 20, fixed pads 20a', tilt pads 20b', fixed pad active surface 26a', tilt pad active surface 26b', surface feature 27', grooves 25a, spray bars 30, 30', and/or apertures 32, 32' will vary from one embodiment of the hybrid bearing 10' to the next, as will the optimal configuration thereof. Accordingly, the hybrid bearing 10' as disclosed and claimed herein is in no way limited by the specific constraints of those elements unless so indicated in the following claims.

The hybrid bearing 10' as disclosed and claimed herein may extend to any rotating machinery for which an increase in power loss reduction is desired, and is in no way limited to the specific embodiments pictured and/or described herein. The optimal number, dimensions, geometries, relative placement, shapes, and/or configuration of journal pads 20, fixed pads 20a', tilt pads 20b', grooves 25a', spray bars 30', apertures 32', and/or any other element of the hybrid bearing 10' or trailing edge cooled bearing 10 may vary from one embodiment of the hybrid bearing 10' or trailing edge cooled bearing 10 to the next, and are therefore in no way limiting to the scope thereof unless otherwise indicated in the following claims. The various elements of an apparatus using at least one feature of the present disclosure may be formed of any material that is suitable for the application for which the apparatus is used. Such materials include but are not limited to metals and their metal alloys, polymeric materials, ceramics, and/or combinations thereof.

Although the specific embodiments pictured and described herein may pertain to tilting pad journal bearings having an equal number of journal pads 20, fixed pads 20a', and/or tilt pads 20b', the hybrid bearing 10' may be configured with other orientations and/or with different quantities of the various elements having different shapes and/or orientations, equally or unequally spaced from other elements of bearings 10, 10'. Accordingly, the scope of the present disclosure is in no way limited by the specific shape, configuration, and/or dimensions of the above elements, and/or the relative quantities and/or positions thereof unless otherwise indicated in the following claims.

The materials used to construct the apparatuses and/or components thereof for a specific process will vary depending on the specific application thereof, but it is contemplated that polymers, synthetic materials, metals, metal alloys, natural materials, ceramics, composites, and/or combinations thereof may be especially useful in some applications. Accordingly, the above-referenced elements may be constructed of any material known to those skilled in the art or later developed, which material is appropriate for the specific application of the present disclosure without departing from the spirit and scope of the present disclosure unless so indicated in the following claims.

Having described preferred aspects of the various processes and apparatuses, other features of the present disclosure will undoubtedly occur to those versed in the art, as will numerous modifications and alterations in the embodiments and/or aspects as illustrated herein, all of which may be achieved without departing from the spirit and scope of the present disclosure. Accordingly, the methods and embodiments pictured and described herein are for illustrative purposes only, and the scope of the present disclosure extends to all processes, apparatuses, and/or structures for providing the various benefits and/or features of the present disclosure unless so indicated in the following claims.

While the hybrid bearing and components thereof have been described in connection with preferred aspects and specific examples, it is not intended that the scope be limited to the particular embodiments and/or aspects set forth, as the embodiments and/or aspects herein are intended in all respects to be illustrative rather than restrictive. Accordingly, the apparatuses and embodiments pictured and described herein are no way limiting to the scope of the present disclosure unless so stated in the following claims.

Although several figures are drawn to accurate scale, any dimensions provided herein are for illustrative purposes only and in no way limit the scope of the present disclosure unless so indicated in the following claims. It should be noted that the hybrid bearing and/or components thereof are not limited to the specific embodiments pictured and described herein, but rather the scope of the inventive features according to the present disclosure is defined by the claims herein. Modifications and alterations from the described embodiments will occur to those skilled in the art without departure from the spirit and scope of the present disclosure.

Any of the various features, components, functionalities, advantages, aspects, configurations, etc. of a hybrid bearing or component thereof may be used alone or in combination with one another depending on the compatibility of the features, components, functionalities, advantages, aspects, configurations, process steps, process parameters, etc. Accordingly, a nearly infinite number of variations of the present disclosure exist. Modifications and/or substitutions of one feature, component, functionality, aspect, configuration, process step, process parameter, etc. for another in no way limit the scope of the present disclosure unless so indicated in the following claims.

It is understood that the present disclosure extends to all alternative combinations of one or more of the individual features mentioned, evident from the text and/or drawings, and/or inherently disclosed. All of these different combinations constitute various alternative aspects of the present disclosure and/or components thereof. The embodiments described herein explain the best modes known for practicing the apparatuses, methods, and/or components disclosed herein and will enable others skilled in the art to utilize the same. The claims are to be construed to include alternative embodiments to the extent permitted by the prior art.

Unless otherwise expressly stated in the claims, it is in no way intended that any process or method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including but not limited to: matters of logic with respect to arrangement of steps or operational flow; plain meaning derived from grammatical organization or punctuation; the number or type of embodiments described in the specification.

The invention claimed is:

1. A hybrid bearing comprising:
   a. a main body;
   b. a first pad engaged with said main body, wherein said pad includes an active surface;
   c. a non-metallic material engaged with a first portion of said active surface of said first pad;
   d. said non-metallic material engaged with a second portion of said active surface of said first pad; and,
   e. a third portion on said active surface comprised of a metallic material, wherein said first and second portions of said active surface are separated from one another by said third portion.

2. The hybrid bearing according to claim 1 wherein said non-metallic material is further defined as a polymer material.

3. The hybrid bearing according to claim 1 wherein said non-metallic material is further defined as a ceramic material.

4. The hybrid bearing according to claim 1 wherein said first portion of said active surface is further defined as having an area less than eight five percent (85%) of an area of said active surface.

5. The hybrid bearing according to claim 1 wherein said first pad is moveable with respect to said main body in at least one dimension.

6. The hybrid bearing according to claim 5 further comprising a second pad having an active surface thereon, wherein a position of said second pad is fixed with respect to said main body.

7. The hybrid bearing according to claim 6 further comprising a second non-metallic material engaged with a first portion of said active surface of said second pad.

8. The hybrid bearing according to claim 1 wherein said first pad is further defined as being constructed of a non-metallic material.

9. A hybrid bearing comprising:
   a. a main body;
   b. a first pad engaged with said main body, wherein said pad includes an active surface, and wherein said first pad is moveable with respect to said main body in at least one dimension;
   c. a second pad engaged with said main body, wherein said second pad includes an active surface, and wherein a position of said second pad is fixed with respect to a position of said main body;
   d. a non-metallic material engaged with a portion of said active surface of said first pad;
   e. said non-metallic material engaged with a second portion of said active surface of said first pad; and
   f. a third portion on said active surface comprised of a metallic material, wherein said portion and said second portion of said active surface are separated from one another by said third portion.

10. The hybrid bearing according to claim 9 further comprising a second non-metallic material engaged with a first portion of said active surface of said second pad.

11. A hybrid bearing comprising:
    a. a main body;
    b. a first pad engaged with said main body, wherein said first pad has an active surface thereon, and wherein said active surface is comprised of a metallic material;
    c. a second pad engaged with said main body, wherein said second pad is configured with an active surface thereon; and,
    d. a non-metallic material engaged with a portion of said active surface of said second pad.

12. The hybrid bearing according to claim 11 wherein said non-metallic material is further defined as a ceramic material.

13. The hybrid bearing according to claim 11 wherein said non-metallic material is further defined as a polymer material.

14. The hybrid bearing according to claim 11 further comprising a third pad engaged with said main body, wherein said third pad is moveable with respect to said main body in at least one dimension.

15. The hybrid bearing according to claim 11 wherein said second pad is further defined as being constructed of said non-metallic material.

16. The hybrid bearing according to claim 11 wherein said first pad is positioned above said second pad.

17. The hybrid bearing according to claim 16 wherein said second pad is further defined as being moveable with respect to said main body in at least one dimension.

18. The hybrid bearing according to claim 17 wherein said first pad is further defined as being fixed with respect to said main body in at least one dimension.

19. The hybrid bearing according to claim 16 wherein said first pad is further defined as being moveable with respect to said main body in at least one dimension.

20. The hybrid bearing according to claim 19 wherein said second pad is further defined as being fixed with respect to said main body in at least one dimension.

* * * * *